United States Patent
Bradski et al.

(10) Patent No.: US 10,967,506 B2
(45) Date of Patent: Apr. 6, 2021

(54) DETERMINING A VIRTUAL REPRESENTATION OF AN ENVIRONMENT BY PROJECTING TEXTURE PATTERNS

(71) Applicant: X Development LLC, Mountain View, CA (US)

(72) Inventors: Gary Bradski, Mountain View, CA (US); Kurt Konolige, Mountain View, CA (US); Ethan Rublee, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 491 days.

(21) Appl. No.: 15/827,321

(22) Filed: Nov. 30, 2017

(65) Prior Publication Data

US 2018/0093377 A1  Apr. 5, 2018

Related U.S. Application Data

(63) Continuation of application No. 14/961,607, filed on Dec. 7, 2015, now Pat. No. 9,862,093, and a
(Continued)

(51) Int. Cl.
*B25J 9/16* (2006.01)
*G06T 7/529* (2017.01)
(Continued)

(52) U.S. Cl.
CPC .............. *B25J 9/163* (2013.01); *B25J 5/00* (2013.01); *B25J 9/0093* (2013.01); *B25J 9/162* (2013.01);
(Continued)

(58) Field of Classification Search
CPC ...... G06K 9/00201–00214; G06K 9/20–2036; G06K 2009/2045;
(Continued)

(56) References Cited

U.S. PATENT DOCUMENTS 4,907,169 A    3/1990 Lovoi
5,577,130 A *  11/1996 Wu .................... G06K 9/20
                                                      382/106

(Continued)

FOREIGN PATENT DOCUMENTS

WO    2007/050776 A2    5/2007

OTHER PUBLICATIONS

Curless, Brian et al., A Volumetric Method for Building Complex Models from Range Images, Proceedings of the 23rd annual conference on Computer Graphics and Interactive Techniques, p. 303-312, ACM, New York, New York, Aug. 4-9, 1996.

(Continued)

*Primary Examiner* — Bao Long T Nguyen
(74) *Attorney, Agent, or Firm* — McDonnell Boehnen Hulbert & Berghoff LLP

(57) ABSTRACT

Example methods and systems for determining 3D scene geometry by projecting patterns of light onto a scene are provided. In an example method, a first projector may project a first random texture pattern having a first wavelength and a second projector may project a second random texture pattern having a second wavelength. A computing device may receive sensor data that is indicative of an environment as perceived from a first viewpoint of a first optical sensor and a second viewpoint of a second optical sensor. Based on the received sensor data, the computing device may determine corresponding features between sensor data associated with the first viewpoint and sensor data associated with the second viewpoint. And based on the determined corresponding features, the computing device may determine an output including a virtual representation of the environment that includes depth measurements indicative of distances to at least one object.

21 Claims, 13 Drawing Sheets

Related U.S. Application Data continuation of application No. 14/212,514, filed on Mar. 14, 2014, now Pat. No. 9,233,470.

(60) Provisional application No. 61/793,151, filed on Mar. 15, 2013, provisional application No. 61/798,425, filed on Mar. 15, 2013, provisional application No. 61/798,564, filed on Mar. 15, 2013, provisional application No. 61/798,505, filed on Mar. 15, 2013.

(51) Int. Cl.

| | |
|---|---|
| *G06T 7/593* | (2017.01) |
| *G06T 7/13* | (2017.01) |
| *G06T 17/00* | (2006.01) |
| *G06K 9/00* | (2006.01) |
| *H04N 13/239* | (2018.01) |
| *G06T 7/55* | (2017.01) |
| *H04N 5/33* | (2006.01) |
| *B25J 5/00* | (2006.01) |
| *B65G 41/00* | (2006.01) |
| *G06T 19/00* | (2011.01) |
| *B25J 19/00* | (2006.01) |
| *G06K 9/32* | (2006.01) |
| *G06K 9/62* | (2006.01) |
| *B65G 61/00* | (2006.01) |
| *B65H 67/06* | (2006.01) |
| *B25J 19/02* | (2006.01) |
| *B65G 47/46* | (2006.01) |
| *B65G 47/50* | (2006.01) |
| *G01B 11/25* | (2006.01) |
| *G06K 9/46* | (2006.01) |
| *G06K 9/52* | (2006.01) |
| *G06T 7/60* | (2017.01) |
| *B25J 9/00* | (2006.01) |
| *H04N 13/00* | (2018.01) |

(52) U.S. Cl.
CPC .......... *B25J 9/1612* (2013.01); *B25J 9/1664* (2013.01); *B25J 9/1671* (2013.01); *B25J 9/1687* (2013.01); *B25J 9/1694* (2013.01); *B25J 9/1697* (2013.01); *B25J 19/00* (2013.01); *B25J 19/021* (2013.01); *B65G 41/008* (2013.01); *B65G 47/46* (2013.01); *B65G 47/50* (2013.01); *G01B 11/254* (2013.01); *G06K 9/00201* (2013.01); *G06K 9/00664* (2013.01); *G06K 9/3208* (2013.01); *G06K 9/4604* (2013.01); *G06K 9/4661* (2013.01); *G06K 9/52* (2013.01); *G06K 9/6202* (2013.01); *G06T 7/13* (2017.01); *G06T 7/529* (2017.01); *G06T 7/55* (2017.01); *G06T 7/593* (2017.01); *G06T 7/60* (2013.01); *G06T 17/00* (2013.01); *G06T 19/003* (2013.01); *H04N 5/33* (2013.01); *H04N 13/239* (2018.05); *B65G 61/00* (2013.01); *B65H 67/065* (2013.01); *G05B 2219/31312* (2013.01); *G05B 2219/39391* (2013.01); *G05B 2219/40053* (2013.01); *G05B 2219/40298* (2013.01); *G05B 2219/40442* (2013.01); *G05B 2219/40543* (2013.01); *G06T 2200/04* (2013.01); *H04N 2013/0081* (2013.01); *Y10S 901/01* (2013.01); *Y10S 901/02* (2013.01); *Y10S 901/06* (2013.01); *Y10S 901/09* (2013.01); *Y10S 901/47* (2013.01)

(58) Field of Classification Search
CPC .......... G06K 9/209; G06K 9/34; G06K 9/36; G06K 9/40; G06K 9/46–4609; G06K 9/6288; G06K 9/78–82; G06K 9/00664; G06K 9/3208; G06K 9/6202; G06K 9/4661; G06K 9/52; G06T 7/0059; G06T 7/0075; G06T 7/0004–001; G06T 7/0065; G06T 7/40; G06T 2207/10012–10021; G06T 2207/10028; G06T 2207/10048; G06T 2207/20136; G06T 2207/30108–30112; G06T 2207/30148–30152; G06T 2207/30164; G06T 7/55; G06T 19/003; G06T 7/529; G06T 7/593; G06T 7/13; G06T 7/60; G06T 17/00; G06T 2200/04; B25J 9/1694; B25J 9/1697; B25J 19/02–023; B25J 19/04; B25J 9/163; B25J 19/00; B25J 9/1687; B25J 5/00; B25J 9/1612; B25J 9/1664; B25J 9/0093; B25J 9/162; B25J 19/021; B25J 9/1671; G05B 2219/37009; G05B 2219/37017; G05B 2219/37567; G05B 2219/37572; G05B 2219/39369; G05B 2219/40136; G05B 2219/40603; G05B 2219/39393; G05B 2219/39391; G05B 2219/40543; G05B 2219/31312; G05B 2219/40053; G05B 2219/40298; G05B 2219/40442; Y10S 901/44; Y10S 901/46–47; Y10S 901/50; Y10S 901/06; Y10S 901/02; Y10S 901/01; Y10S 901/09; H04N 13/239; H04N 5/33; H04N 2013/008; B65G 41/008; B65G 61/00; B65G 47/46; B65G 47/50; B65H 67/065; G01B 11/254

USPC .......... 700/250, 253–254, 258–259; 901/44, 901/46–47, 50, 6, 2, 1, 9; 318/568.16, 318/568.22–568.23; 382/153–154

See application file for complete search history.

(56) References Cited

U.S. PATENT DOCUMENTS

| | | |
|---|---|---|
| 5,870,490 A | 2/1999 | Takahashi et al. |
| 6,970,600 B2 | 11/2005 | Abe |
| 7,075,625 B2 | 7/2006 | Abe |
| 8,010,231 B2 | 8/2011 | Sumida et al. |
| 8,180,486 B2 | 5/2012 | Saito et al. |
| 8,363,907 B2 | 1/2013 | Hassebrook et al. |
| 8,545,517 B2 | 10/2013 | Bodduluri et al. |
| 8,982,182 B2 | 3/2015 | Shpunt et al. |
| 9,233,470 B1 | 1/2016 | Bradski et al. |
| 2003/0231788 A1 | 12/2003 | Yukhin et al. |
| 2008/0279446 A1* | 11/2008 | Hassebrook ......... G06K 9/2036 382/154 |
| 2010/0165195 A1 | 7/2010 | Ratner et al. |
| 2010/0166282 A1 | 7/2010 | Hirota |
| 2010/0222925 A1* | 9/2010 | Anezaki .............. G05D 1/0253 700/253 |
| 2011/0164114 A1* | 7/2011 | Kobayashi ............ G01B 11/25 348/46 |
| 2012/0152877 A1 | 6/2012 | Tadayon |
| 2012/0194516 A1* | 8/2012 | Newcombe ............ G06T 17/00 345/420 |
| 2012/0268567 A1 | 10/2012 | Nakazato et al. |
| 2012/0287247 A1 | 11/2012 | Stenger et al. |
| 2012/0294510 A1 | 11/2012 | Zhang et al. |
| 2013/0182077 A1 | 7/2013 | Holz |
| 2013/0335535 A1 | 12/2013 | Kane et al. |

OTHER PUBLICATIONS

Davis, James et al., Spacetime Stereo: A Unifying Framework for Depth from Triangulation, Princeton Computer Science Tech Report TR-689-04, 2004.

(56) References Cited

OTHER PUBLICATIONS

Konolige, Kurt, Projected Texture Stereo, Proceedings of the 2010 IEEE International Conference on Robotics and Automation (ICRA), p. 148-155, May 3-7, 2010.

Lorensen et al., Marching Cubes: A High Resolution 3D Surface Construction Algorithm, Computer Graphics, vol. 21, No. 4, p. 163-169, Jul. 1987.

Newcombe et al., KinectFusion: Real-Time Dense Surface Mapping and Tracking, Proceedings of the 2011 10th IEEE Inernational Symposium on Mixed and Augmented Reality, p. 127-136, IEEE Computer Society, Washington, DC, 2011.

Okutomi et al., A Multiple-Baseline Stereo, IEEE Transactions on Pattern Analysis and Machine Intelligence, vol. 15, No. 4, p. 353-363, Apr. 1993.

\* cited by examiner

DETERMINING A VIRTUAL REPRESENTATION OF AN ENVIRONMENT BY PROJECTING TEXTURE PATTERNS

CROSS REFERENCE TO RELATED APPLICATIONS

The present application is a continuation of U.S. Non-provisional patent application Ser. No. 14/961,607 filed on Dec. 7, 2015 and entitled "Determining a Virtual Representation of an Environment By Projecting Texture Patterns," which is a continuation of U.S. Non-provisional patent application Ser. No. 14/212,514 filed on Mar. 14, 2014 and entitled "Determining a Virtual Representation of an Environment by Projecting Texture Patterns," the contents of each of which are hereby incorporated by reference.

The present application claims priority to U.S. Provisional patent application Ser. No. 61/793,151 filed on Mar. 15, 2013 and entitled "Mixed Case Palletizing and Truck Loading/Unloading," U.S. Provisional patent application Ser. No. 61/798,425 filed on Mar. 15, 2013 and entitled "Environment Reconstruction and Trajectory Planning," U.S. Provisional patent application Ser. No. 61/798,564 filed on Mar. 15, 2013 and entitled "Object Reconstruction and Detection," and U.S. Provisional patent application Ser. No. 61/798,505 filed on Mar. 15, 2013 and entitled "Optical Sensors," which are each herein incorporated by reference as if fully set forth in this description.

BACKGROUND

Unless otherwise indicated herein, the materials described in this section are not prior art to the claims in this application and are not admitted to be prior art by inclusion in this section.

Robotic systems, such as a robotic arm containing a gripping component, may be used for applications involving picking up or moving objects. For instance, a robotic device may be used to fill a container with objects, create a stack of objects, or unload objects from a truck bed. In some cases, all of the objects may be of the same type. In other cases, a container or truck may contain a mix of different types of objects, such as boxed items, cans, tires, or other stackable objects. Such robotic systems may direct a robotic arm to pick up objects based on predetermined knowledge of where objects are in the environment.

SUMMARY

Many computer vision techniques involve triangulating information observed from at least two known viewpoints to determine a representation of three-dimensional (3D) scene geometry. For instance, a stereo camera system can be used to determine the depth to points in a scene, as measured from the center point of the line between their focal points (i.e., the baseline). If corresponding features in two or more images of an object are identified, a set of rays generated by the corresponding points may be intersected to find the 3D position of the object or depth to the object. However, when an object has little or no visual texture, it can be difficult to identify corresponding features in images of the object. Accordingly, the present disclosure provides methods and apparatuses that enable determining 3D scene geometry by projecting patterns of light onto a scene. In some examples, multiple different random patterns of light may be projected onto a scene. As described herein, multiple texture patterns may be projected at the same time, in sequence, or both. Observations of the different patterns of light may then be used to identify corresponding features. Furthermore, various arrangements and configurations of projectors and optical sensors that enable more accurate and detailed 3D reconstruction of a scene are presented.

In one example, a method is provided that involves projecting a plurality of different patterns of light using a plurality of projectors. The plurality of different patterns of light may include a first random texture pattern projected by a first projector of the plurality of projectors and having a first wavelength and a second random texture pattern projected by a second projector of the plurality of projectors and having a second wavelength. The method may further involve receiving sensor data by a computing device and from a plurality of optical sensors. The plurality of optical sensors may be configured to distinguish between the plurality of different patterns of light. And the sensor data may be indicative of an environment of the computing device as perceived from a first viewpoint of a first optical sensor of the plurality of optical sensors and a second viewpoint of a second optical sensor of the plurality of optical sensors. The method may also involve determining, by the computing device and based on the received sensor data, corresponding features between sensor data associated with the first viewpoint and sensor data associated with the second viewpoint. Additionally, the method may involve determining, by the computing device and based on the determined corresponding features, an output including a virtual representation of the environment of the computing device. The output may include a depth measurement indicative of a distance to at least one object in the environment.

In another example, a non-transitory computer readable medium having stored therein instructions, that when executed by a computing device, cause the computing device to perform functions is disclosed. The functions may include causing a plurality of projectors to project a plurality of different patterns of light. The plurality of different patterns of light may include a first random texture pattern projected by a first projector of the plurality of projectors and having a first wavelength and a second random texture pattern projected by a second projector of the plurality of projectors and having a second wavelength. The functions may further include receiving sensor data from a plurality of optical sensors. The plurality of optical sensors may be configured to distinguish between the plurality of different patterns of light. And the sensor data may be indicative of an environment of the computing device as perceived from a first viewpoint of a first optical sensor of the plurality of optical sensors and a second viewpoint of a second optical sensor of the plurality of optical sensors. The functions may also include determining, based on the received sensor data, corresponding features between sensor data associated with the first viewpoint and sensor data associated with the second viewpoint. Additionally, the functions may include determining, based on the determined corresponding features, an output including a virtual representation of the environment of the computing device. The output may include a depth measurement indicative of a distance to at least one object in the environment.

In still another example, a system that includes a robotic manipulator (e.g., arm), at least one projector, at least one stereo camera, and a computing device is provided. The at least one projector may be coupled to the robotic manipulator and configured to project different patterns of light. The at least one stereo camera may also be coupled to the robotic manipulator, and may be configured to obtain sensor data that is indicative of an environment of the system. The computing device may be configured to perform functions including: determining an expected amount of motion of the robotic manipulator during a future time period, determining a number of random texture patterns to project using the at least one projector based on a comparison between the expected amount of motion and a threshold, and causing the at least one projector to project the determined number of random texture patterns during the future time period.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1A:
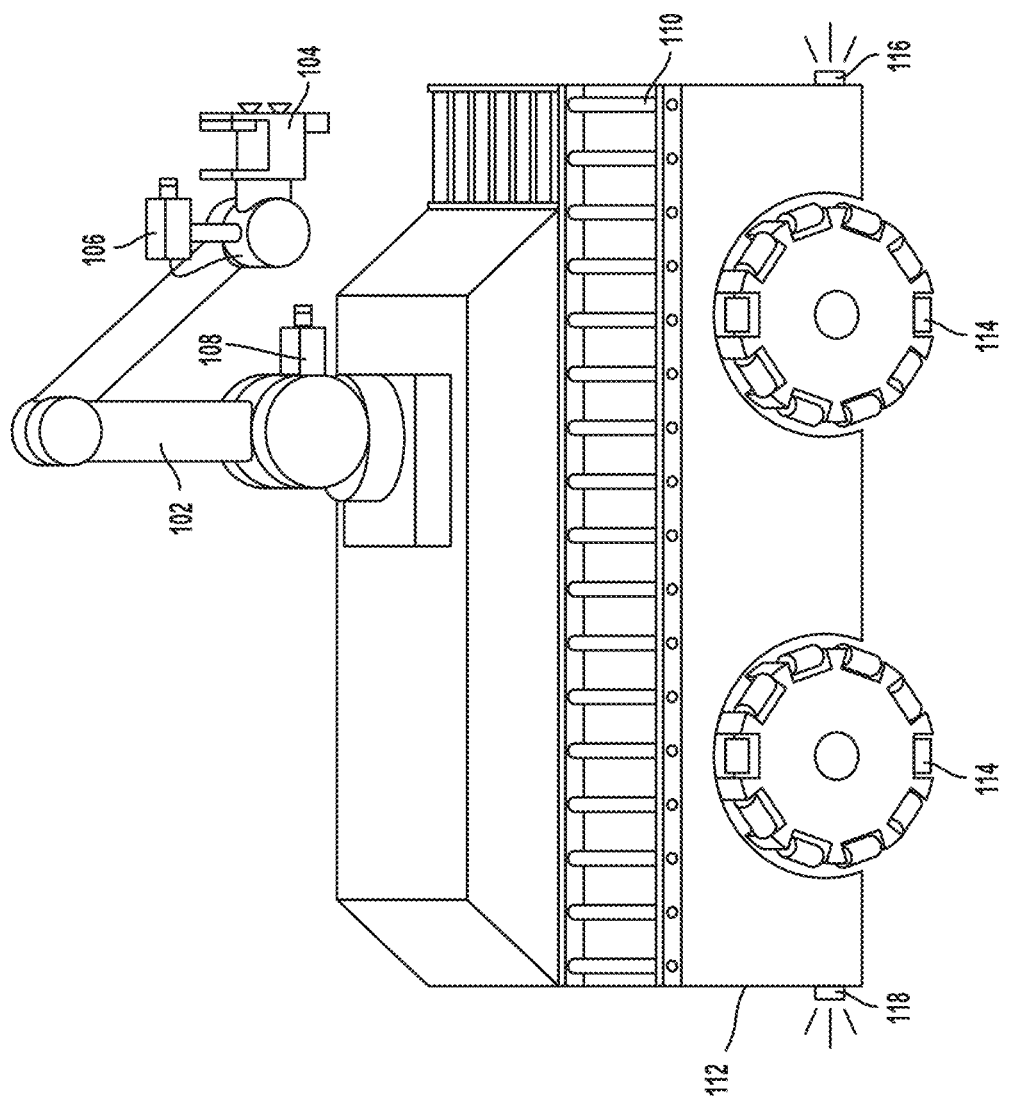
FIG. 1A shows a robotic arm mounted on a moveable cart, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

Methods and apparatuses for determining the 3D geometry of a scene are provided herein. According to various embodiments, multiple different random patterns of light may be projected onto a scene to facilitate identifying corresponding features between at least two images of the scene. In one example method, a plurality of different patterns of light may be projected onto a scene. For instance, a single projector may project multiple patterns in sequence, or multiple projectors may be used to project different patterns at the same time. As a particular example, a first projector may project a first random texture pattern having a first wavelength and a second projector may project a second random texture pattern having a second wavelength. The first wavelength and the second wavelength may be different infrared wavelengths, for instance.

A plurality of optical sensors may then capture images of the scene and provide sensor data to a computing device. For example, a first optical sensor may output one or more images of the scene captured from a first viewpoint and a second optical sensor may output one or more images of the scene captured from a second viewpoint. In an example in which multiple patterns having different wavelengths are projected at the same time, the optical sensors may be configured to distinguish between the different wavelengths using pixel filters.

Given the images of the scene, the computing device may then determine corresponding features between an image(s) associated with the first viewpoint and an image(s) associated with the second viewpoint. By way of example, the computing device may use a block matching technique to match a block of pixels in a first image against a range of blocks in a second image. As another example, the computing device may determine a first spatio-temporal image by combining a first sequence of images associated with the first viewpoint and determine a second spatio-temporal image by combining a second sequence of images associated with the second viewpoint. Each spatio-temporal image may be a data structure that stores information about changes in pixels of the image over the sequence of images. Thus, if multiple patterns are projected over the time period of the sequence of images, each pixel of the spatio-temporal image may have a unique footprint. The computing device may then determine matching pixels (or segments of pixels) between the first spatio-temporal image and the second spatio-temporal image.

Furthermore, after identifying corresponding features between images, the computing device may use triangulation to provide an output that includes a virtual representation of the environment. For instance, the output may include a depth measurement indicative of a distance to a point on the surface of at least one object in the environment, or multiple depth measurements indicative of distances to different points on the surface(s) of the at least one object. In certain examples, the computing device may then use the virtual representation to perform any of the loading/unloading or palletizing/depalletizing functions described below.

In some examples, the computing device may combine information from multiple pairs of optical sensors (e.g. stereo pairs of optical sensors) to refine one or more depth measurements. For example, a first stereo pair and a second stereo pair may be located at a first position and a second position respectively. The computing device may use sensor data provided by the first stereo pair and second stereo pair respectively to generate a first depth image and a second depth image. Based on the distance between the first position and the second position, the computing device may then refine the depth measurements associated with the environment using the first depth image and the second depth image. In one embodiment, rather than using two stereo pairs, a robotic device may move a single stereo pair of optical sensors from the first position to the second position in order to obtain sensor data from two different positions.

In another embodiment, a variable projection system is provided. The system may include a robotic manipulator, at least one projector coupled to the robotic manipulator, and at least one stereo camera coupled to the robotic manipulator. The at least one projector may be configured to project different patterns of light onto a scene, and the stereo camera may be configured to obtain sensor data indicative of the environment of the system. The system may also include a computing device that is configured to change the number of patterns projected by the at least one projector based on an expected amount of motion in the environment.

As an example, the computing device may be configured to determine an expected amount of motion of a robotic manipulator during a future time period (e.g., the next second, five seconds, one minute, etc.). For instance, the expected amount of motion may be an expected change in the position of the robotic manipulator during the future time period that affects a position of the stereo camera or the projector. Based on a comparison between the expected amount of motion and a threshold, the computing device may then determine a number of random texture patterns to project using the at least one projector. For instance, if the robotic manipulator is not expected to move during the next five seconds, and the threshold is one centimeter, the computing device may cause the at least one projector to project multiple patterns in sequence. On the other hand, if the robotic manipulator is expected to move more than one centimeter away from its current position during the next five seconds, the computing device may opt to cause the at least one projector to project a single pattern, or cause multiple projectors to project different patterns at the same time.

Various additional examples are described below, therefore the above examples are not meant to be limiting. For illustration, portions of the methods and apparatuses will be described with respect to stereo triangulation. It should be understood, however, that part or all of the methods and apparatus may apply equally to other computer vision techniques. For instance, one of ordinary skill in the art will appreciate that any of the methods and apparatus disclosed herein may utilize structured-light triangulation techniques (e.g., illuminating a scene with a particularly structured light pattern and capturing a single image of the scene) instead of or in addition to the stereo triangulation techniques described.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

According to various embodiments, described herein are methods and systems for automated loading and/or unloading of boxes and/or other objects, such as into a storage container or from a vehicle. In some example embodiments, boxes or objects may be automatically organized and placed onto pallets (palletized) or automatically removed from pallets (depalletized). Within examples, automating the process of loading/unloading trucks and/or the process of palletizing/depalletizing objects may provide a number of industrial and business advantages.

According to various embodiments, automating the process of loading/unloading trucks and/or the process of palletizing/un-palletizing objects may include the incorporation of one or more robotic devices to move objects or perform other functions. In some embodiments, a robotic device can be made mobile by coupling the robotic device with a wheeled base, a holonomic base (e.g., a base that can move in any direction), or rails on the ceiling, walls or floors. In some embodiments, the base can be an elevated base.

In some examples, a system including one or more sensors, one or more computers, and one or more robotic arms is described. The sensors may scan an environment containing one or more objects in order to capture visual data and/or 3D depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

As used herein, the term "boxes" will refer to any object or item that can be placed onto a pallet or loaded onto or unloaded from a truck or container. For example, in addition to rectangular solids, "boxes" can refer to cans, drums, tires or any other "simple" shaped geometric items. Additionally, "loading" and "unloading" can each be used to imply the other. For example, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet while the term "depalletizing" refers to removing boxes from a pallet. In addition, the terms "palletizing" and "depalletizing" can each be used to imply the other.

According to various embodiments, a robotic manipulator may be mounted on a holonomic cart (e.g., a cart with wheels that allow the cart to move in any direction). FIG. 1A depicts an exemplary holonomic cart containing a robotic manipulator. In some embodiments, a moveable cart 112 may include a robotic arm 102 mounted on the cart 112. The robotic arm 102 may contain a gripping component 104 for gripping objects within the environment. The cart may contain one or more wheels 114, which may be holonomic wheels that operate with two degrees of freedom. In further embodiments, a wraparound front conveyor belt 110 may be included on the holonomic cart 112. In some examples, the wraparound front conveyer belt 110 may allow the robot to not have to rotate its gripper to the left or right when unloading or loading boxes from or to a truck container or pallet.

In other examples, the robotic manipulator may be mounted on a different type of movable apparatus or may not be mounted on a movable base at all. For example, the robotic manipulator may be mounted at a fixed position within a factory setting. In other example embodiments, one or more robotic manipulators may be mounted on rails of a truck or container. In such examples, the robotic manipulators may be used to load or unload the truck or container.

Figure 1B:
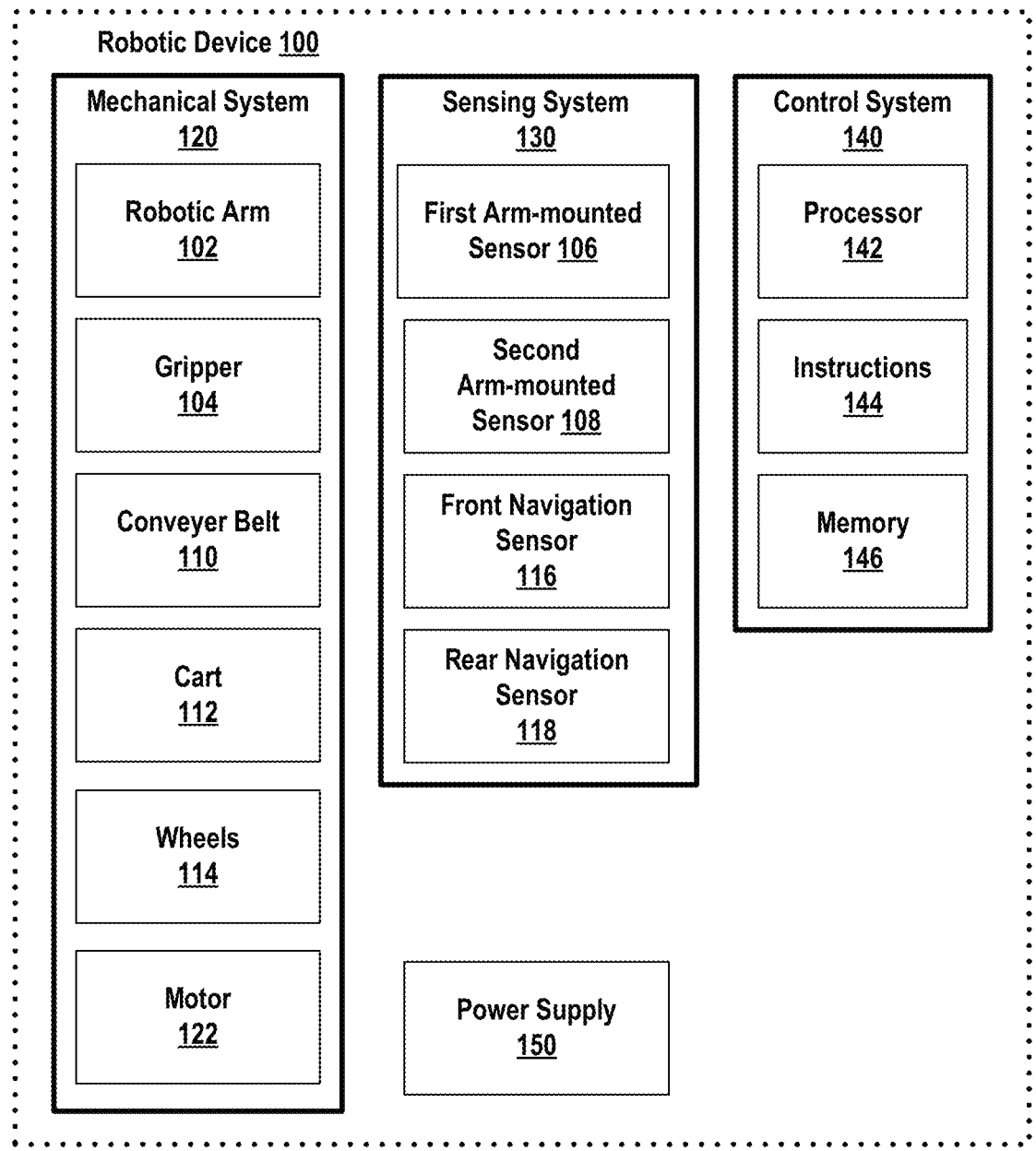
FIG. 1B is a functional block diagram illustrating a robotic device, according to an example embodiment.

FIG. 1B is a functional block diagram illustrating a robotic device 100, according to an example embodiment. The robotic device 100 could include various subsystems such as a mechanical system 120, a sensing system 130, a control system 140, as well as a power supply 150. The robotic device 100 may include more or fewer subsystems and each subsystem could include multiple elements. Further, each of the subsystems and elements of robotic device 100 could be interconnected. Thus, one or more of the described functions of the robotic device 100 may be divided up into additional functional or physical components, or combined into fewer functional or physical components. In some examples, additional functional and/or physical components may be added to the examples illustrated by FIGS. 1A and 1B.

The mechanical system 120 may include components described above with respect to FIG. 1A, including a robotic arm 102, a gripper 104, a conveyer belt 110, a (movable or holonomic) cart 112, and one or more wheels 114. The mechanical system 120 may additionally include a motor 122, which may be an electric motor powered by electrical power, or may be powered by a number of different energy sources, such as a gas-based fuel or solar power. Additionally, motor 122 may be configured to receive power from power supply 150. The power supply 150 may provide power to various components of robotic device 100 and could represent, for example, a rechargeable lithium-ion or lead-acid battery. In an example embodiment, one or more banks of such batteries could be configured to provide electrical power. Other power supply materials and types are also possible.

The sensing system 130 may use one or more sensors attached to a robotic arm 102, such as sensor 106 and sensor 108, which may be 2D sensors and/or 3D depth sensors that sense information about the environment as the robotic arm 102 moves. The sensing system may determine information about the environment that can be used by control system 140 (e.g., a computer running motion planning software) to pick and move boxes efficiently. The control system 140 could be located on the device or could be in remote communication with the device. In further examples, scans from one or more 2D or 3D sensors mounted on a mobile base, such as a front navigation sensor 116 and a rear navigation sensor 118, and one or more sensors mounted on a robotic arm, such as sensor 106 and sensor 108, may be integrated to build up a digital model of the environment, including the sides, floor, ceiling, and/or front wall of a truck or other container. Using this information, the control system 140 may cause the mobile base to navigate into a position for unloading or loading.

In additional examples, planar surface information may be extracted from 3D sensors to model walls, the floor/ceiling, and/or box faces. After modeling the floor, projecting objects onto the floor plane may enable segmentation of obstacles and/or target objects such as boxes. Floor-plane projection can also be used to model the corrugated sides of a container or truck, which may not be accurately modeled as planes. In further examples, sidewall angles, floor plane roll and pitch, and/or distances from side walls can be used to maneuver a mobile base into a container without collisions. Use of extended 3D information rather than a single line scan may help make the extraction of navigation information robust. For example, the side walls may have a vertical extent that is captured by the 3D sensor. Scanning systems that use a single line of depth information may be slower if they scan vertically and/or less robust because they acquire less information. In additional examples, front plane modeling can determine the distance to a next group of objects to pick in truck unloading.

In further examples, the robotic arm 102 may be equipped with a gripper 104, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

In some embodiments, the gripper could potentially span several boxes or objects and turn on suction for some or all of the covered objects. In some embodiments, the suction or adhesion devices may be a "digital" grid so that the robotic device can turn on any number of the suction devices as will fit boxes sensed for grabbing. In some implementations, the system may notice a seam in the boxes (separation between adjacent boxes) such that suction devices can be activated on both sides of the seam to pick up both boxes at once, thereby doubling the throughput. In some embodiments, the suction devices can sense after a certain amount time whether they can successfully grip a surface, after which they may automatically shut off. In further embodiments, sections of the suction devices can fold down to grasp the top of the boxes. For instance, grippers can initially start at full extension and then conform to the surface being gripped.

In further examples, the robotic arm can implement a wiggle movement to improve a suction grip. In additional embodiments, the robotic arm can wiggle a box side-to-side to help segment the box from its surroundings. In other embodiments, the arm can wiggle upon pick up of the box to avoid jostling other objects. In such embodiments, when trying to adhere to an object in order to pick it up using suction, the robotic arm may employ a wiggle motion in order to make a firm seal against the object. In further examples, the robotic arm may wiggle the object as the robotic arm is picking up the object so that the box can more gently break friction or overlap contact with other items. This may help avoid a situation where pulling the object up too directly or too quickly causes other items to be tossed into the air.

According to various embodiments, cardboard boxes can have concave, convex or otherwise rumpled faces that make it hard for a suction device to adhere to. Thus, wiggling the suction device as the device makes suction contact may enable a more reliable grip on cardboard boxes and other non-planar objects. In further examples, when first grabbing a box, a few center suction devices can be turned on and the arm can wiggle back and forth as it starts to pull the box out. This may break surface adhesion with other boxes and help to start to pull the box out. Once the box is at least partially pulled out, the box may then be segmented from the other boxes more easily. In some embodiments, wiggling while picking up an object in clutter may remove other objects from the picked up object, thereby preventing unwanted pick up of surrounding objects.

According to various embodiments, segmentation of items may be necessary for successful grasping. In some embodiments, a smooth surface patch may belong to two separate objects. In such instances, manipulator interaction with the objects may be used to perturb the scene to better segment the objects from each other. For motion separation, the natural or forced movement of objects on a conveyor, on a slide, moving in a tote, and/or actively jostled within a tote may be tracked by optical flow, parallax, or time delayed views to calculate stereo depth in order to enhance object segmentation.

In other examples, one or more of the sensors used by a sensing system may be a RGBaD (RGB+active Depth) color or monochrome camera registered to a depth sensing device that uses active vision techniques such as projecting a pattern into a scene to enable depth triangulation between the camera or cameras and the known offset pattern projector. This type of sensor data may help enable robust segmentation. According to various embodiments, cues such as barcodes, texture coherence, color, 3D surface properties, or printed text on the surface may also be used to identify an object and/or find its pose in order to know where and/or how to place the object (e.g., fitting the object into a fixture receptacle). In some embodiments, shadow or texture differences may be employed to segment objects as well.

Many or all of the functions of robotic device 100 could be controlled by control system 140. Control system 140 may include at least one processor 142 (which could include at least one microprocessor) that executes instructions 144 stored in a non-transitory computer readable medium, such as the memory 146. The control system 140 may also represent a plurality of computing devices that may serve to control individual components or subsystems of the robotic device 100 in a distributed fashion.

In some embodiments, memory 146 may contain instructions 144 (e.g., program logic) executable by the processor 142 to execute various functions of robotic device 100, including those described above in connection with FIGS. 1A-1B. Memory 146 may contain additional instructions as well, including instructions to transmit data to, receive data from, interact with, and/or control one or more of the mechanical system 120, the sensor system 130, and/or the control system 140.

Figure 2A:
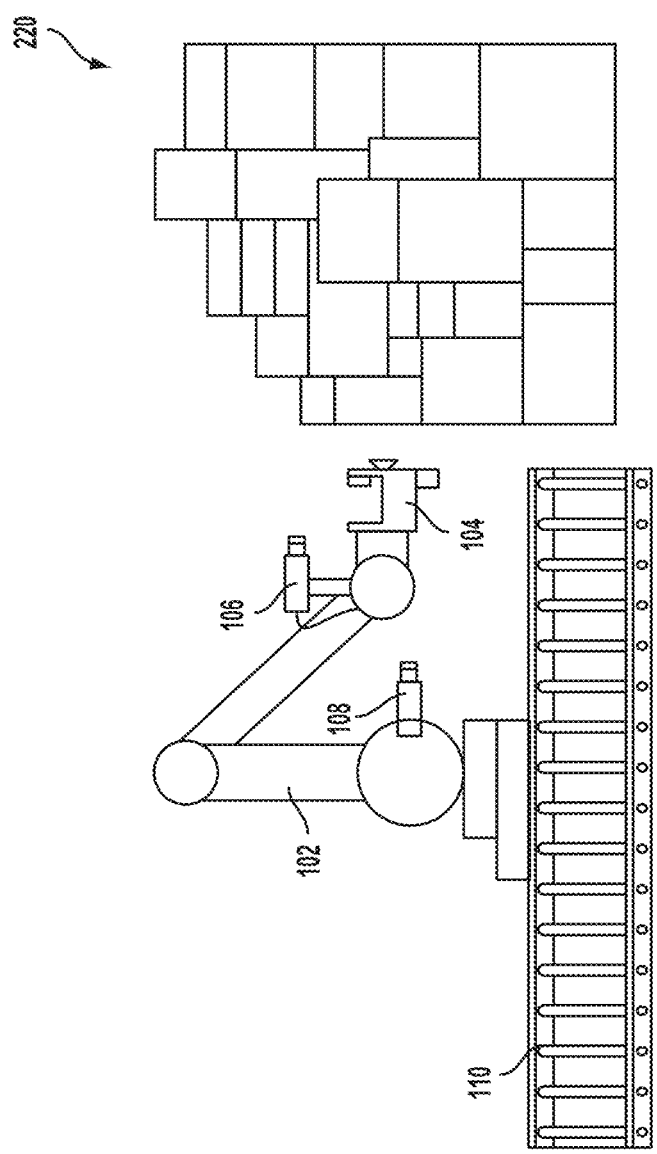
FIG. 2A shows a robotic arm and a stack of boxes, according to an example embodiment.

According to various embodiments, a perception guided robot is described. For instance, a robotic device may utilize a combination of perception together with planning to guide the robot arm to pick up a box and place the box where it needs to go. FIG. 2A illustrates part of the robotic device from FIG. 1A with a stack of boxes, according to an example embodiment. As shown, the robotic device may include a robotic arm 102 with a gripping component 104, sensors 106 and 108, and conveyer 110 as described above. In some examples, the robotic device could be mounted on a holonomic cart as described with respect to FIG. 1A, could be mounted on a different type of movable apparatus, could be mounted on rails or tracks, or could be stationary. The robotic device may be controlled to pick boxes from a stack of boxes 220 containing a heterogeneous mix of shapes and sizes of boxes.

Figure 2B:
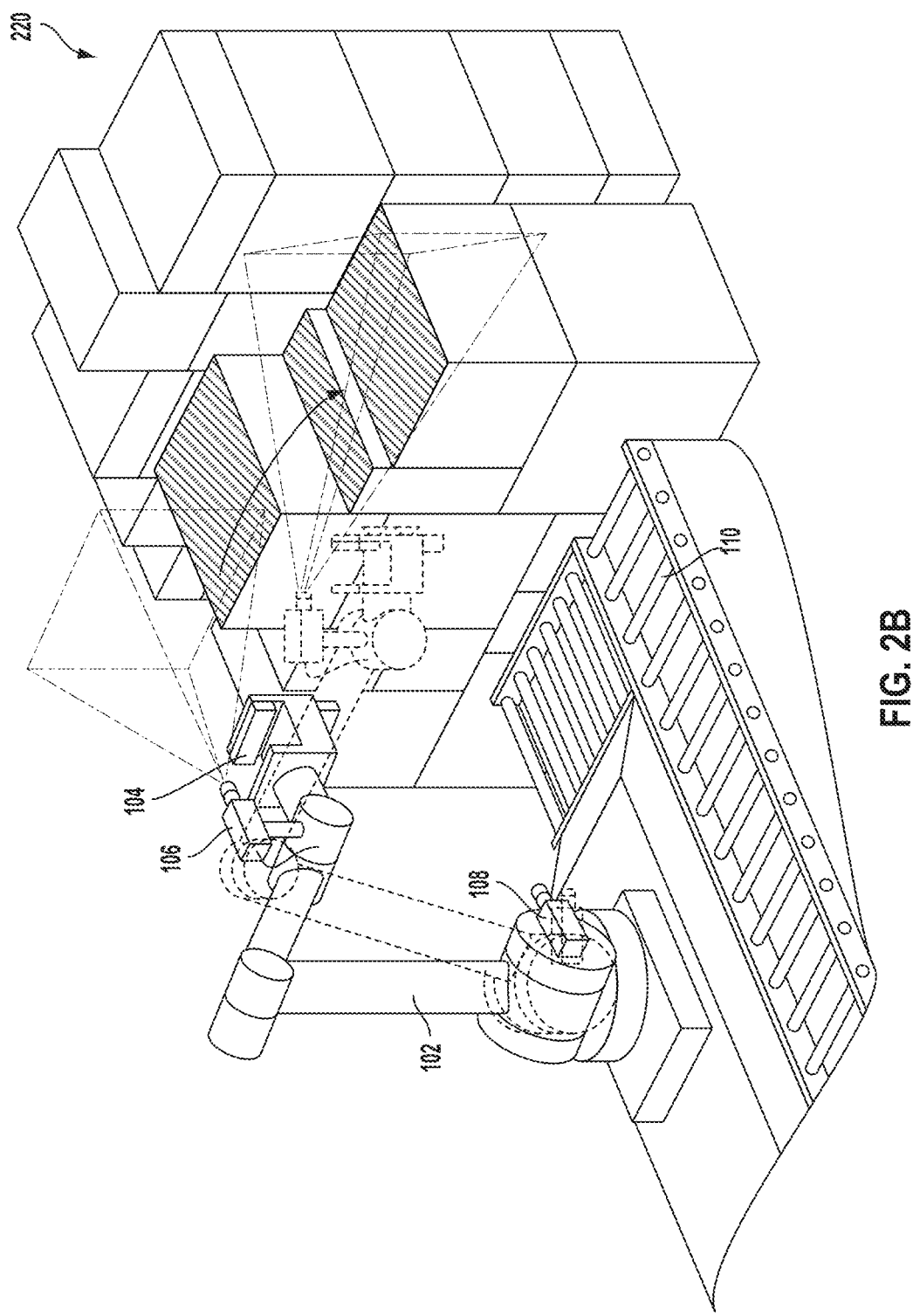
FIG. 2B shows scanning of the stack of boxes from FIG. 2A by a sensor mounted on the robotic arm, according to an example embodiment.

Within examples, a virtual environment including a model of the objects in 2D and/or 3D may be determined and used to develop a plan or strategy for picking up the boxes. In some examples, the robot may use one or more sensors to scan an environment containing objects, as shown in FIG. 2B. As the robotic arm 102 moves, a sensor 106 on the arm may capture sensor data about the stack of boxes 220 in order to determine shapes and/or positions of individual boxes. In additional examples, a larger picture of a 3D environment may be built up by integrating information from individual (e.g., 3D) scans. Sensors performing these scans may be placed in fixed positions, on a robotic arm, and/or in other locations. According to various embodiments, scans may be constructed and used in accordance with any or all of a number of different techniques.

In some examples, scans can be made by moving a robotic arm upon which one or more 3D sensors are mounted. Feedback from the arm position may provide pose information about where the sensor is positioned and may be used to help with the integration. Alternately, or additionally, scans may be made using one or more 2D sensors, for instance by leveraging motion and tracking key-points in the environment. In further examples, scans may be from fixed-mount cameras that have fields of view (FOVs) covering a given field. In additional examples, scans may be visually registered to help with fine pose estimation, potentially giving better integration results.

In further examples, a virtual environment may be built up using a 3D volumetric or surface model to integrate information (e.g., from different sensors). This may allow the system to operate within a larger environment, such as in cases where one sensor may be insufficient to cover a large environment. Such techniques may also increase the level of detail captured, which may help the robotic device perform various tasks. In particular, integrating information can yield finer detail than from a single scan alone (e.g., by bringing down noise levels). This may enable better object detection, surface picking, or other applications.

In further examples, wide-angle environment reconstruction may be performed by sensing an environment and extracting that information into a simplified geometric model of simple mathematical 3D geometric forms (e.g., planes, cylinders, cones, hemispheres, etc.). In some instances, such techniques may make motion planning easier and/or may make violation of the models (e.g., collisions) easier to detect. Alternately, or additionally, such techniques may allow a parametric description to extend the environment. For instance, the ground may be treated as a plane that extends behind objects that occlude it.

In additional examples, planes or other mathematical surfaces in the environment may be extracted in 3D. These known "ideal" surface detections may be combined into a more accurate model of the environment. For instance, planes may be used to determine the full extents of walls (or mathematical description thereof) and other obstacles to avoid collisions and detect the locations of objects of interest. Also, mathematical representations of objects may be used to look for anomalies such as a person entering into an environment. Such events may violate the ideal model, which may make their detection easier.

In other examples, certain objects such as boxes may have simple planar form. For instance, a metal can may have a geometric form of a cylinder and a tire may have a geometric form of a torus. Example systems may leverage this trait of certain objects in order to model them and/or determine how to motion plan for the objects. For instance, known templates of certain shapes can be used to refine detected features of objects within the environment that appear to match a particular shape.

In some examples, 2D and 3D information may be represented at least in part via one or more facades. A facade may be defined as a near-planar construct containing a set of objects, represented as a depth map (e.g., a 2D map with distances as a third dimension). Examples of facades may include a wall of boxes in a truck, a top of a pallet stack containing boxes or other objects, or a top of a bin of jumbled objects.

Figure 2C:
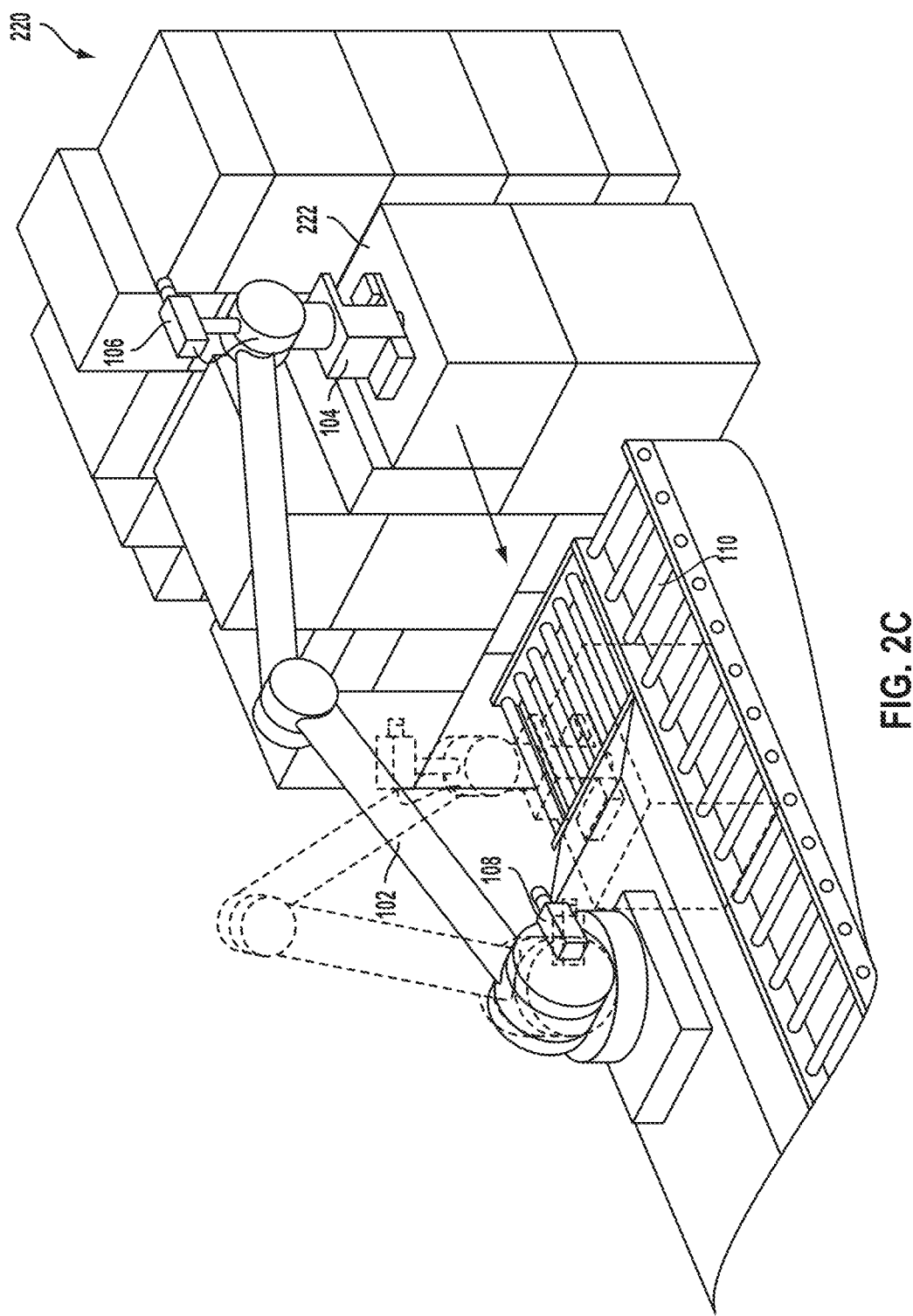
FIG. 2C shows the robotic arm from FIG. 2A moving a box, according to an example embodiment.

In further examples, a facade may be constructed from boxes, for instance to plan an order for picking up the boxes. For instance, as shown in FIG. 2C, box 222 may be identified by the robotic device as the next box to pick up. Box 222 may be identified within a facade representing a front wall of the stack of boxes 220 constructed based on sensor data collected by one or more sensors, such as sensors 106 and 108. A control system may then determine that box 222 is the next box to pick, possibly based on its shape and size, its position on top of the stack of boxes 220, and/or based on characteristics of a target container or location for the boxes. The robotic arm 102 may then be controlled to pick up the box 222 using gripper 104 and place the box 222 onto the conveyer belt 110 (e.g., to transport box 222 into a storage area).

In additional examples, a facade may be represented as an orthographic projection of 3D surface information. This representation may allow for parsing the facade to determine interesting areas for a particular application. For example, in truck unloading, the upper left corner of the next box to pick up may be determined based on a facade representation. In other examples, an orthographic projection of an integrated 3D environment may be determined to give a wide-FOV, easily-parsed representation for performing application-related tasks. One such task may be finding the corner or corners (e.g., top left) of a box to pick. Another such task may involve finding good surfaces (e.g., relatively flat and large) for picking objects out of a bin.

In further examples, a 3D model of a stack of boxes may be constructed and used as a model to help plan and track progress for loading/unloading boxes to/from a stack or pallet. Any one actual camera view of the facade may suffer from point of view occlusions and perspective distortion. Accordingly, multiple RGBD views via robot arm movements and/or different views from a cart base or fixed locations may be combined to create a single facade of the boxes to be picked.

In other examples, the 3D model may be used for collision avoidance. Within examples, planning a collision-free trajectory may involve determining the 3D location of objects and surfaces in the environment. A trajectory optimizer may make use of the 3D information provided by environment reconstruction to optimize paths in the presence of obstacles. In further examples, the optimizer may work in real time and may accept many kinds of constraints. As an example of such a constraint, the optimizer may attempt to keep the end effector level throughout the trajectory.

In additional examples, an environment may be captured as a mesh or set of 3D points. A robot arm may be represented as a convex hull of plane segments for quick collision checking. Constant or frequent updating of the environment may allow the robot arm to quickly respond to changes. In further examples, an optimizer may perform frequent continuous collision checking throughout its path. An optimizer may accept arbitrary constraints in the form of costs, such as to keep a certain distance away from objects or to approach a goal position from a given angle. Additionally, an optimizer may avoid robot fault conditions by working in joint space, keeping track of windup and choosing goal positions from among multiple inverse kinematics solutions. One strategy for motion planning may involve looking ahead several moves to see if the chosen goal joint position will be acceptable for the next move.

In some embodiments, path constraints, such as collision avoidance for robotic arms, cameras, cables, and/or other components, may be put in a constraint based planning solver and solved for to yield a best path to move the arm for perception. Additionally, in some embodiments, the solver may determine a best path for picking up, moving, and placing an object.

According to various embodiments, 3D and/or visual sensors may be calibrated to determine their pose with respect to the workspace. In the case of fixed sensors, the calibration may determine their fixed pose in the workspace. In the case of a sensor on the arm, calibration may determine the offset pose of the sensor from the arm link to which it is attached.

Within examples, calibration techniques may allow for the calibration of an arbitrary number of sensors in the workspace. Calibration may involve determining some or all of a variety of parameters and coefficients. For example, calibration may solve for one or more intrinsic parameters such as focal length and image center. As another example, calibration may determine one or more distortion coefficients such as models of radial and tangential distortion. As yet another example, calibration may solve for one or more extrinsic parameters defining a position of an object in a scene relative to a pattern or other sensors that identified the same pattern in a scene.

In some examples, calibration may be performed at least in part by using a calibration pattern, which may be a known set of features in 2D or 3D. For instance, a known pattern of dots may be used, where the distance between each dot and the other dots is known. Calibration may be performed at least in part by collecting multiple different views of an object. In further examples, capturing multiple views of a calibration pattern in different positions may allow for (1) calibration of the one or more coefficients of the camera and/or (2) knowledge of where the camera is relative to the coordinate system established by where the calibration pattern was fixed. In particular embodiments, a camera in the scene may identify a calibration pattern on the robot arm while a camera on the arm identifies a calibration pattern in the scene simultaneously.

In additional examples, calibration may involve a camera fixed in a scene. In this case, a calibration pattern may be placed on a robotic arm. The robotic arm may be configured to move through the scene as multiple views of the calibration pattern on the robotic arm are collected. This may help to calibrate the camera and/or be useful for relating the coordinate system of the camera to that of the robot. Further, the relation of each device to the other can be determined by each device as the robotic arm moves.

In certain examples, calibration may involve a camera located on a robotic arm. A calibration pattern may be mounted on a wall or table. Then, the camera may be moved around, collecting multiple views of the calibration pattern from different robot or robotic arm positions. When different 3D or 2D views (e.g., 2, 20, or 200) are collected, these views can be used to solve for the calibration relationships. After calibration, when the camera on the arm moves, the system can determine where it is relative to the coordinate system set based on the location of the calibration pattern in the scene. In particular embodiments, both the calibration pattern and the camera may be movable. For example, the calibration pattern may be located on a conveyor belt where the robotic arm may be configured to place boxes. After calibration, the system may determine where the camera was relative to that spot on the conveyor belt.

In further examples, nonlinear optimization may be performed in a two-stage process for robust estimation of 3D sensor calibration. In one stage, an initialization may be derived from the relative pose offsets of the target and the sensors. In another stage, given the initialization, a batch bundle adjustment may be used to find the optimal pose of the cameras together with the target points. Calibration can be extended to the estimation of robot parameters such as joint lengths and joint angle offsets.

In other examples, known, precise, robot motion of the camera over a calibration pattern, or a calibration pattern over a camera may be used to improve calibration results. For instance, information about precisely how the camera moves may be used to obtain more accurate camera calibration. That is, if the camera is moved 50 mm to the right, the corresponding (perspective projection) amount of movement from the calibration object may be detected. This information may be used to jointly or separately optimize the calibration and tracking parameters.

In additional examples, a robot can look at its ongoing calibration and move in such a way as to maximize information for better calibration. For example, it can detect that some view areas have not been seen and go to those views.

In further examples, a system for the practical manipulation of heterogeneous, categorical items, generally from a cluttered collection area to a defined bin, is presented. In some embodiments, the pick location containing the items may not be sensitive to precise object orientation(s) and items may be mixed together. In additional examples, the place location for the items may or may not be sensitive to object orientation. In some examples, the pick-and-place regions may be defined as 3D regions acceptable for picking or placing an object, with some tolerance. The pick-and-place region may be highly cluttered with similar and/or disparate objects. In other embodiments, the items may come from or be put into a fixture, such as metal or plastic snaps that hold the sorted item in a particular orientation.

In additional examples, environment modeling of both the pick-and-place location may be used for intelligent grasp location and motion, as well as event reporting (e.g., when a place region is full or a pick region is empty). In some examples, object bounding volumes may be computed and/or distinguishing features of objects may be found (such as textures, colors, barcodes or OCR). In some embodiments, objects may be sorted into an assigned destination location by matching against a database of location assignments indexed by object type or object ID. For instance, an object's locations may be derived from reading a barcode, considering the size of the object, and/or by recognizing a particular kind of object.

In some examples, a plan for a robotic device may be determined in order to achieve certain configurations of the objects within a target location for the objects. For instance, the goals for loading/unloading or palletizing/depalletizing may be to achieve: 1) a dense packing with minimal air gaps in between boxes, and/or 2) a stable packing that won't easily collapse. In some embodiments, stability may require that, in general, heavy objects are on the bottom, and light objects are on top. In other examples, pallets may be created in order to avoid non-interlaced column stacks, column leans, or other characteristics of a bad stack.

In further examples, the pallet or truck/container may be loaded such that work by human operators in subsequent unloading processes is minimized. For instance, in some embodiments, items may be placed in last in, first out order such that, upon unpacking, the items needed first are on top, the items needed second are one layer down and so on. In other examples, the loading of pallets may be independent of how items flow towards the packing cells. Thus, according to some embodiments, the system can handle packages sent in random order or in an order known in advance. In addition, in some embodiments, systems may adapt to changes in the flow of items in real-time. In further examples, one or more boxes may be recorded and buffered by holding the boxes in a temporary storage area where their order can be changed along the way.

According to various embodiments, a 2D simulator and/or a 3D simulator may be utilized for truck or container loading/unloading or for pallet loading/unloading. In some examples, the state of a stack of boxes may be captured in the physical world and input into the simulator. In some embodiments, a variable size queue of boxes from one to all the boxes may be used by a simulator for finding a next box to pick. For example, a queue of 2 boxes or 4 boxes or 10 boxes may be considered by a simulator.

In further examples, the simulator may search over the boxes in the queue to find the best box placement by heuristic algorithms and/or by brute force or multi-resolution search. In some embodiments, the system may increment with increasingly fine placement of boxes around the best sites found in the previously coarser level. In some embodiments, once placement of a particular next box has been determined, a physics planner may be used for motion planning in order to move the box efficiently to the determined locations. In further examples, the physical and simulated stacks may be continuously monitored for quality of the stack (e.g., density, stability, and/or order placement). In some examples, the process may be repeated until all the boxes have been placed or the target container can no longer fit in another box.

Figure 3:
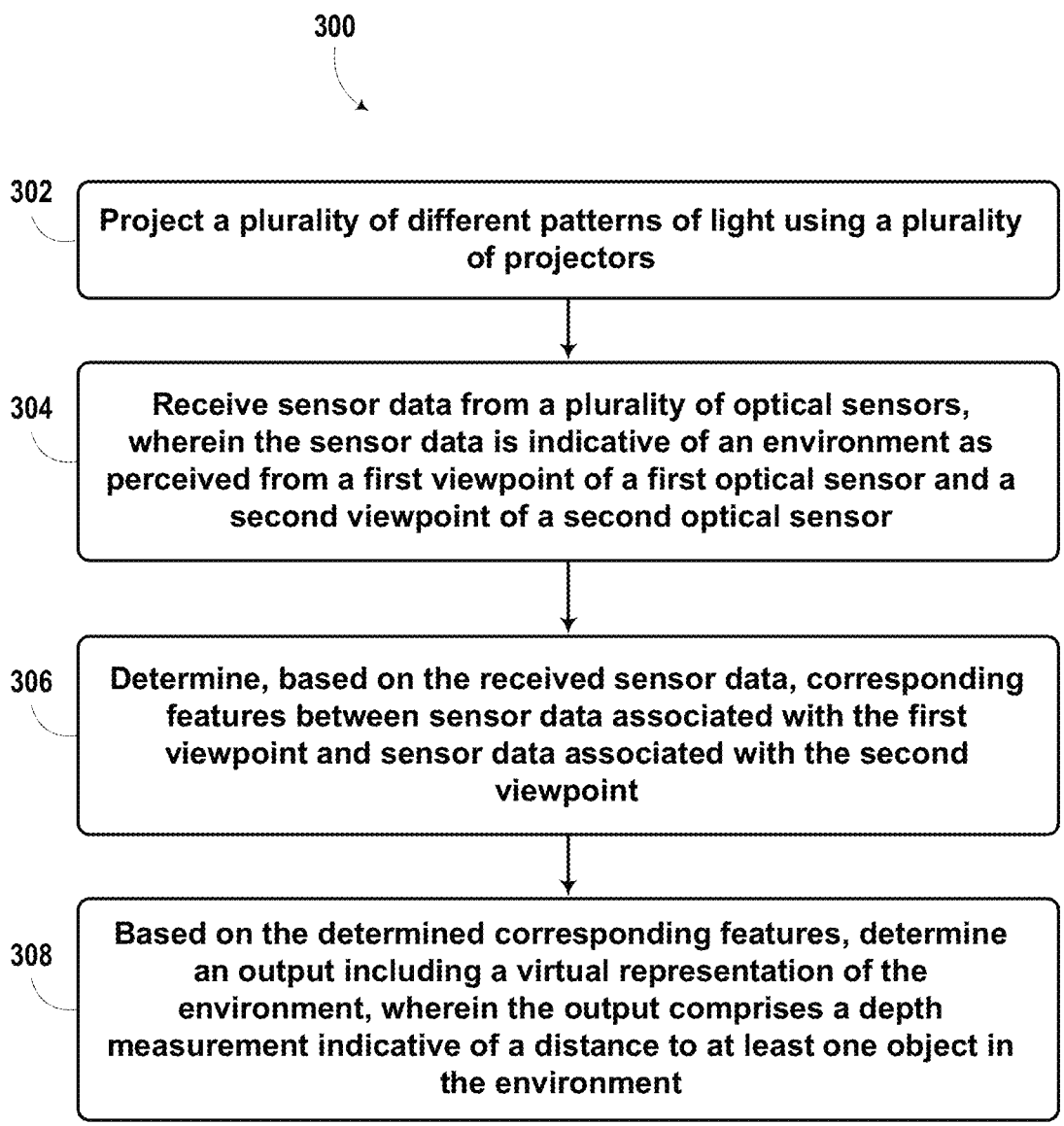
FIG. 3 is a block diagram of a method, according to an example embodiment.

Referring now to FIG. 3, FIG. 3 is a block diagram of an example method 300 for determining a virtual representation of an environment. Method 300 shown in FIG. 3 presents an embodiment of a method that could be used or implemented by the robotic device 100 of FIG. 1B, for example, or more generally by one or more components of any computing device. Method 300 may include one or more operations, functions, or actions as illustrated by one or more of blocks 302-308. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and random access memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device.

In addition, for the method 300 and other processes and methods disclosed herein, each block in FIG. 3 may represent circuitry that is wired to perform the specific logical functions in the process.

In one embodiment, functions of the method 300 may be performed by a control system, such as the control system 140 of FIG. 1B. In other embodiments, the functions of the method 300 may be distributed across multiple control systems that are configured to cause a plurality of projectors to project patterns of light and determine a virtual representation of the environment based on sensor data received from a plurality of optical sensors.

Initially, at block 302, the method 300 involves projecting a plurality of different patterns of light using a plurality of projectors. For instance, each projected texture may be a random pattern of light, such as visible or infrared light, that is intentionally projected into a scene in order to construct easily identifiable features that can then be used to determine matching correspondences between two or more images. By way of example, the plurality of different patterns of light may include a first random texture pattern projected by a first projector having a first wavelength, as well as a second random texture pattern projected by a second projector having a second wavelength. The first random texture pattern and the second random texture pattern may illuminate a common area, such that the patterns overlap on the surface of one or more objects in the environment. As another example, the plurality of different patterns of light may include a sequence of different patterns projected by a single projector.

In some embodiments, a projector may include a light source, projection optics, and a liquid crystal display (LCD) or other method of interrupting light with a pattern. In other embodiments, a projector may generate a laser-based speckle pattern by shining light on a diffraction grating or a diffusion grating. For instance, by illuminating a plane of small random lenslets. Each lenslet may act as a spherical radiator, and the resultant phase differences from many such lenslets may produce a far-field speckle pattern. The size of the speckles can be modulated by changing the beam size, and the field of view of the pattern can be controlled based on the refraction properties of the lenslets, and interposing lenses after the lenslets to image the speckles.

In some examples, one or more of the plurality of projectors may be coupled to a robotic device, such as the robotic device 100. For instance, two or more projectors may be coupled to the robotic arm 102 of FIG. 1A. Additionally or alternatively, one or more projectors may be mounted on the cart 112 of FIG. 1A. In another instance, one or more projectors may be mounted to the walls or ceiling of a room, or rails connected to the walls or ceiling of the room. Each of the plurality of projectors may be controlled by a computing device, such as the control system 140 of FIG. 1B.

In one example, the computing device may cause the plurality of projectors to project multiple random texture patterns in sequence when an expected amount of motion in a scene during a future time period is less than a threshold. The expected amount of motion in the scene may include one or any combination of: an expected amount of motion of a robotic manipulator, such as the robotic arm 102 of FIG. 1A, to which a projector or an optical sensor used to observe a projected pattern is coupled; an expected amount of motion of a cart, such as the cart 112 of FIG. 1A, to which a projector or an optical sensor is coupled; or an expected amount of motion of objects in the scene. As one example, the threshold may be one centimeter, such that if the robotic manipulator is not moving by more than one centimeter during the next three seconds, the threshold is not exceeded. In response to determining that the expected amount of motion is less than the threshold, the computing device may then cause the plurality of projectors to project multiple random patterns in sequence. On the other hand, when objects in the environment are in motion, or the position of one or more of the projectors is changing, or the position of one or more optical sensors used to observe the projected patterns is changing, the computing device may instead cause a single projector to project a single pattern, or cause the plurality of projectors two project one or more patterns at the same time.

At block 304, the method 300 involves receiving sensor data from a plurality of optical sensors. The sensor data may be indicative of an environment as received from a first viewpoint of a first optical sensor and a second viewpoint of a second optical sensor. As one example, the received sensor data may include a first image output by a first optical sensor located at a first position and a second image output by a second optical sensor located at a second position. As another example, the received sensor data may include a first sequence of images output by a first optical sensor located at a first position and a second sequence of images output by a second optical sensor located at a second position.

In other embodiments, the plurality of optical sensors may include more than two optical sensors. For example, the plurality of optical sensors may include a first stereo pair and a second stereo pair. As another example, the plurality of optical sensors may include a first stereo pair located at a first position and a second optical sensor located at another position.

The plurality of optical sensors may include any types of optical sensors, such as charge-coupled device (CCD) image sensors, complementary metal-oxide-semiconductor (CMOS) image sensors, or other types of sensors configured to convert an optical image into an electronic signal. By way of example, one or more of the optical sensors may be a red/green/blue (RGB) infrared (IR) camera. Additionally, one or more of the optical sensors may be a RGB camera. The RGB IR camera(s) or RGB camera(s) may be global shutter cameras, such that the pixels of a particular camera store information at the same time. In some instances, a single device may perform the functions of both an optical sensor and a projector. Thus, the functions of one or more of the plurality of optical sensors may be performed by one or more of the plurality of projectors.

In one example, one or more of the optical sensors may be configured to distinguish between different wavelengths of light. For example, an optical sensor may include pixel filters placed over pixel sensors in an array, such that a first wavelength of light is passed to some pixel sensors but not to other pixel sensors, and similarly a second wavelength of light is passed to some pixel sensors but not to other pixel sensors. The pixel filters may be similar to a color filter array that passes red, green, or blue light to selected pixel sensors, except that the pixel filters instead pass a first wavelength and a second wavelength to selected pixel sensors.

At block 306, the method 300 involves determining, based on the received sensor data, corresponding features between sensor data associated with the first viewpoint and sensor data associated with the second viewpoint. In an example in which the sensor data associated with the first viewpoint and the second viewpoint includes a first image and second image respectively, a block matching algorithm may be used to determine corresponding features between the first image and the second image. For example, a segment of pixels of the first image (e.g., a 4×4, 10×10, or 20×20 window of pixels) may be matched against a range of segments of pixels in the second image to determine the closest matching segment of pixels in the second image. For example, the closest matching segment of pixels may be determined by minimizing a match function.

In an example in which the sensor data associated with the first viewpoint and the second viewpoint includes a first sequence of images and a second sequence of images respectively, a block matching algorithm may similarly be used to determine corresponding features between spatiotemporal images. For example, given the first sequence of images, a first spatio-temporal image that combines information in the sequence of images for each pixel or groups of pixels may be determined. Similarly, a second spatio-temporal image may be determined by combining the second sequence of images.

And at block 308, the method 300 involves determining, based on the determined corresponding features, an output including a virtual representation of the environment. For example, the output may include a depth measurement indicative of a distance to at least one object in the environment. In one instance, the output may be a depth map that is determined using triangulation, given the distance between a first optical sensor and a second optical sensor. Given the pixel positions of a pair of corresponding features, various triangulation methods can be used to reconstruct the 3D position of the identified feature. According to the process of triangulation, the 3D position (x, y, z) of a point P can be reconstructed from the perspective projection of P on the image planes of a first sensor and a second sensor, given the relative position and orientation of the two sensors. Therefore, if the pixel positions of a pair of corresponding features is known, and the relative position and orientation of the two sensors is known, the 3D position of the feature can be determined.

As discussed above, in some examples, the method 300 may further involve combining information from a first depth image generated at a first position and a second depth image generated at a second position. For instance, the computing device may combine information from multiple pairs of optical sensors (e.g. stereo pairs of optical sensors) to refine the depth measurements. As one example, a first stereo pair and a second stereo pair may be located at a first position and a second position respectively. The computing device may use sensor data provided by the first stereo pair and second stereo pair respectively to generate a first depth image and a second depth image. Based on the distance between the first position and the second position, the computing device may then refine the depth measurements associated with the environment using the first depth image and the second depth image.

According to one embodiment, rather than using two stereo pairs of optical sensors, a robotic device may move a single stereo pair of optical sensors from the first position to the second position in order to obtain sensor data from two different positions.

Similarly, in some embodiments, stereo pairs of optical sensors may exist in a trinocular configuration, where triangulation occurs both vertically and horizontally. By way of example, a first optical sensor and a second optical sensor may be positioned side-by-side, and a third optical sensor may be positioned above or below the first optical sensor and the second optical sensor. In such a configuration, sensor data received from the first optical sensor and the second optical sensor may be triangulated, sensor data received from the second optical sensor and the third optical sensor may be triangulated, and/or sensor data received from the first optical sensor and the second optical sensor may be triangulated. This configuration may yield more accuracy, at a potentially increased cost in hardware and/or data processing.

Turning now to FIGS. 4A-4D, FIGS. 4A-4D are conceptual illustrations of example arrangements of projectors and sensors. For purposes of explanation, the projectors and sensors depicted in FIGS. 4A-4D are each shown mounted to a common frame. However, in other examples, the projectors and/or sensors may be mounted to separate structures, such as other parts of a robotic device, a wall or ceiling of an environment, or rails attached to a wall or ceiling in an environment. Furthermore, any of the example arrangements shown in FIGS. 4A-4D may include more or less sensors or projectors. For example, in some embodiments, each sensor may include a corresponding projector. Thus, the example arrangements depicted in FIGS. 4A-4D are not meant to be limiting.

Figure 4A:
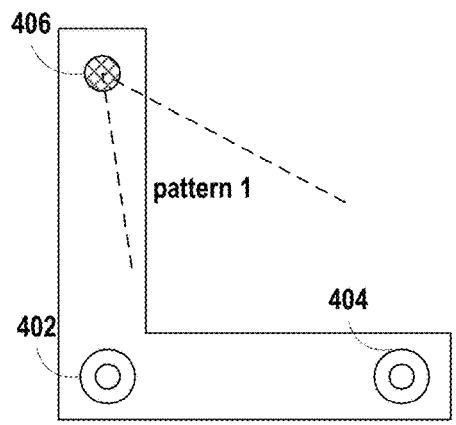
FIGS. 4A-4D are conceptual illustrations of example arrangements of projectors and sensors.
Figure 4B:
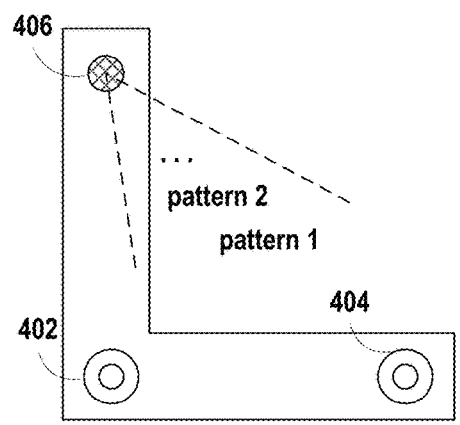

As shown in FIGS. 4A and 4B, one example arrangement may include a first optical sensor 402, a second optical sensor 404, and a projector 406. As depicted in FIG. 4A, the projector 406 may be configured to project a random texture pattern onto an environment. The first optical sensor 402 and the second optical sensor 404 may then capture an image of the environment, including the projected random texture pattern. Further, the first optical sensor 402 may capture an image from a first viewpoint, and the second optical sensor 404 may capture the image from a second viewpoint.

As depicted in FIG. 4B, in some instances, the projector 406 may project multiple random patterns in sequence. For instance, the projector 406 may project a first random texture for a first time period, followed by a second random texture during a subsequent period, and so forth. In some embodiments, the first optical sensor 402, the second optical sensor 404, and the projector 406 may be synced in time, such that the first optical sensor 402 and the second optical sensor 404 capture a first pair of images while the projector 406 projects a first random pattern, and then capture a second pair of images while the projector 406 projects a second random pattern.

Figure 4C:
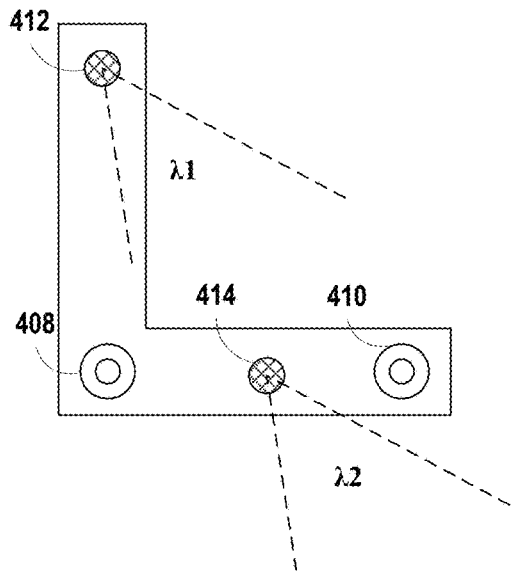
Figure 4D:
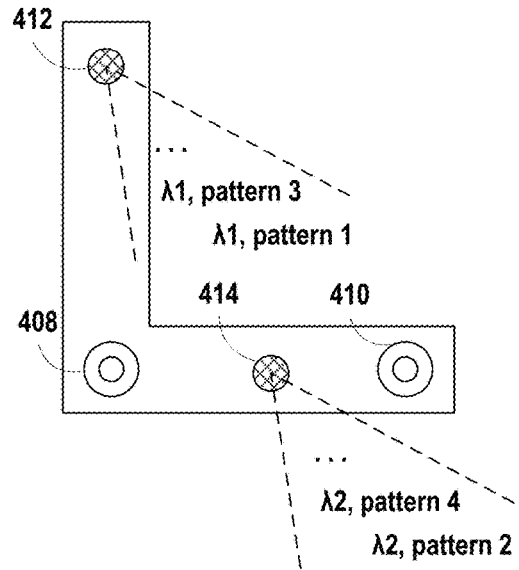

As shown in FIGS. 4C and 4D, another example arrangement may include a first optical sensor 408 and second optical sensor 410, as well as a first projector 412 and a second projector 414. As depicted in FIG. 4C, in some instances, the first projector 412 may project a first random pattern of light having a first wavelength onto an environment while the second projector 414 projects a second random pattern of light having a second wavelength onto the environment. The first optical sensor 408 and the second optical sensor 410 may then capture a pair of images of the environment, including the two overlapping projected patterns. In such an example, the first optical sensor 408 and the second optical sensor 410 may be configured to distinguish between the different wavelengths of light using pixel filters placed over their pixel sensors.

And as depicted in FIG. 4D, in some instances, the first projector 412 and the second projector 414 may project multiple random patterns in sequence. By way of example, the first projector 412 may project a first random pattern having a first wavelength during a first time period and the second projector 414 may project a second random pattern having a second wavelength during the first time period. Subsequently, during a second time period, the first projector 412 may project a third random pattern having the first wavelength and the second projector 414 may project a fourth random pattern having the second wavelength at the same time. As discussed with respect to FIGS. 4A and 4B, in such a configuration, the first optical sensor 408 and the second optical sensor 410 may similarly be synced in time with the first projector 412 and the first projector 414.

Figure 5:
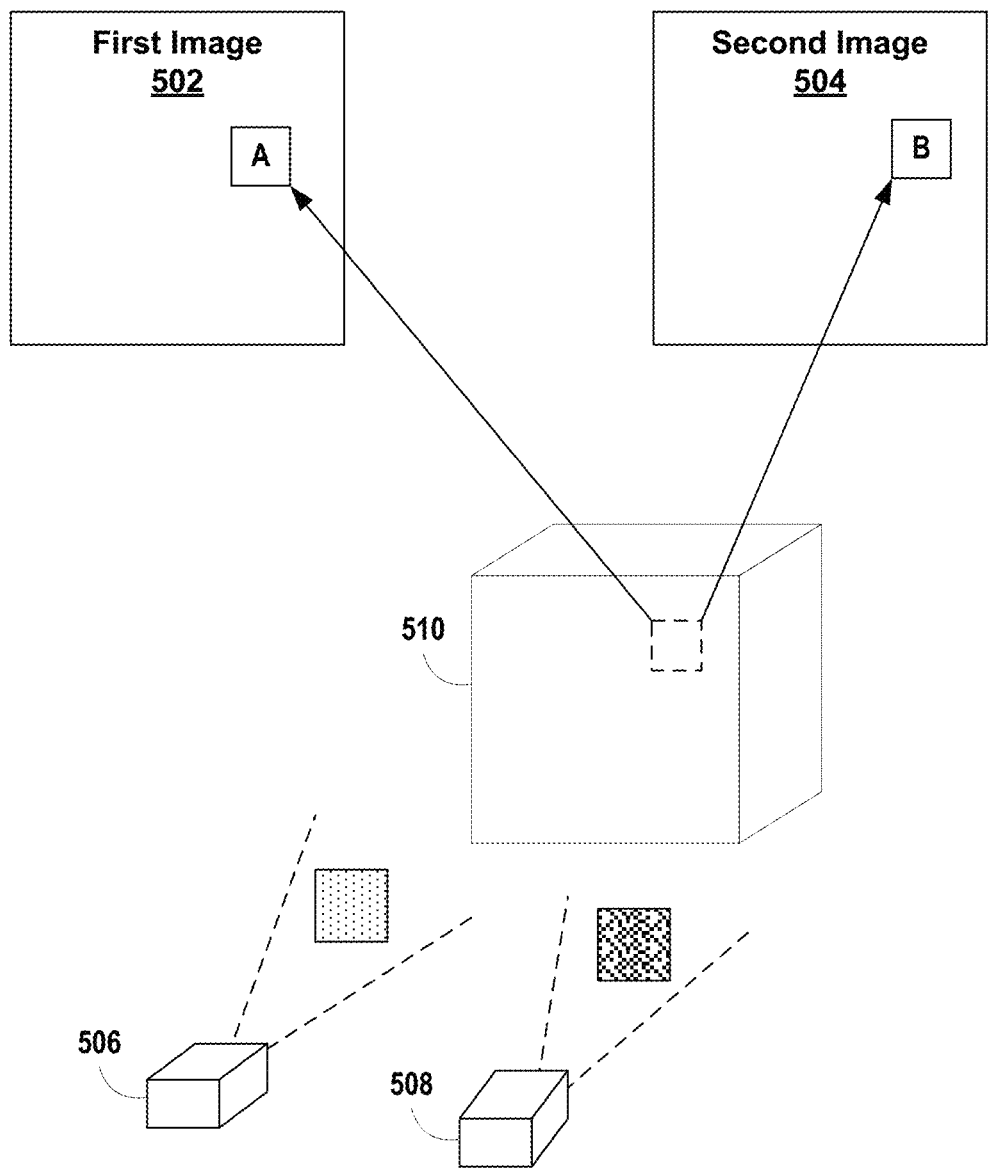
FIG. 5 is a conceptual illustration of corresponding features between a first image and a second image, according to an example embodiment.

FIG. 5 is a conceptual illustration of corresponding features between a first image 502 and a second image 504, according to an example embodiment. In one example, the first image 502 and the second image 504 may be acquired by a first optical sensor and a second optical sensor respectively while a first projector 506 projects a first random texture pattern using a first wavelength of light and a second projector 508 projects a second random texture pattern using a second wavelength of light. The first random texture pattern and the second random texture pattern may illuminate the surface of an object 510.

Upon receiving the first image 502 and the second image 504, a computing device may then determine corresponding features between the first image 502 and the second image 504. For instance, using a block matching algorithm, the computing device may select a pixel segment "A" located on a surface of the object 510 that has a unique overlapping pattern of the first random texture pattern and the second random texture pattern. The computing device may then search for a pixel segment in the second image 504 that matches the unique overlapping pattern. As illustrated in FIG. 5, the computing device may identify that pixel segment "B" of the second image 504 has the same unique overlapping pattern. Given the position and orientation of the first optical sensor and the second optical sensor used to capture the first image 502 and the second image 504, the computing device may then use triangulation to estimate the distance to a point on the surface of the object 510.

Figure 6:
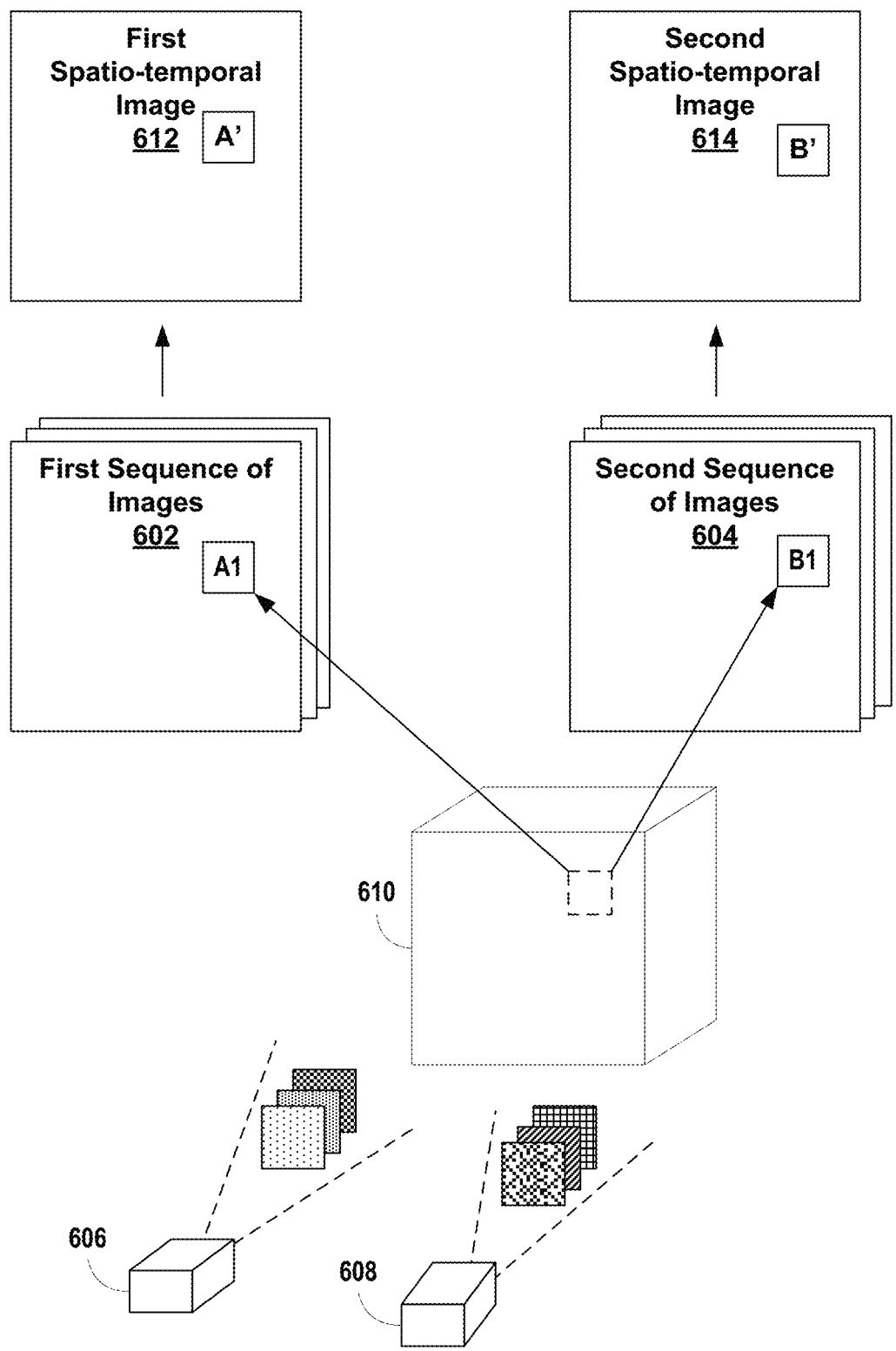
FIG. 6 is a conceptual illustration of corresponding features between a first sequence of images and a second sequence of images, according to an example embodiment.

As discussed, above, the corresponding features may also be identified between spatio-temporal images representing sequences of images. FIG. 6 is a conceptual illustration of corresponding features between a first sequence of images 602 and a second sequence of images 604, according to an example embodiment.

In one example, the first sequence of images 602 and the second sequence of images 604 may be acquired by a first optical sensor and a second optical sensor respectively while a first projector 606 projects a first sequence of random patterns and a second projector 608 projects a second sequence of random patterns. The first optical sensor, second optical sensor, first projector 606, and second projector 608 may be synced in time, such that each image of the first sequence of images 602 and the second sequence of images 604 captures an image of an object 610 while a pattern projected by the first projector 606 and a pattern projected by the second projector 608 illuminates a surface of the object 610. In other words, in the first images of the first and second sequences of images, a first random pattern projected by the first projector may overlap a second random pattern projected by the second projector. Similarly, in the second images of the first and second sequences of images, a third random pattern projected by the first projector may overlap a fourth random pattern projected by the second projector, and so forth.

Upon receiving the first sequence of images 602 and the second sequence of images 604, a computing device may determine a first spatio-temporal image 612 and a second spatio-temporal image 614. In particular, the computing device may determine the first spatio-temporal image by combining the first sequence of images, and the computing device may determine the second spatio-temporal image by combining the second sequence of images. For instance, the computing device may combine information from a segment of pixels "A1" of the first image of the first sequence of images, a segment of pixels "A2" of the second image of the first sequence of images, and so forth, to determine a representation "A" of the segment of pixels. Thus, the representation "A" may be a unique footprint that describes a particular segment of pixels over time. The computing device may repeat the process for any number of segments of pixels of the first sequence of images. In one embodiment, the computing device may determine a unique footprint of each particular pixel over the sequence of images. The second spatio-temporal image 614 may be determined in a similar manner.

The computing device can then match a pixel or segment of pixels of the first spatio-temporal image 612 against pixels or segments of pixels of the second spatio-temporal image to determine the locations of corresponding features. For instance, the results of a matching algorithm may indicate that a segment of pixels "A'" of the first spatio-temporal image 612 corresponds to a segment of pixels "B'" of the second spatio-temporal image 614. And given the position and orientation of the first optical sensor and the second optical sensor used to capture the first sequence of images 602 and the second sequence of images 614, the computing device may then use triangulation to estimate the distance to a point on the surface of the object 610.

Figure 7:
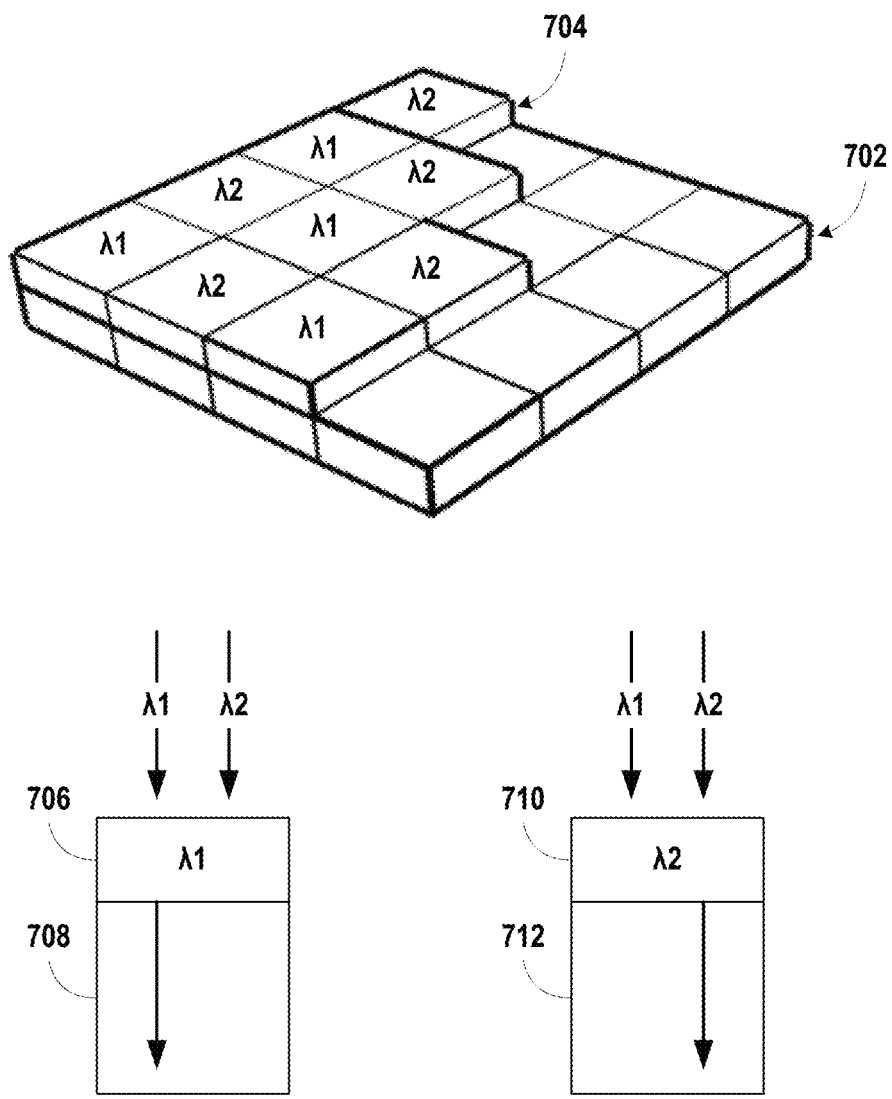
FIG. 7 is a conceptual illustration of an example arrangement of pixel filters.

As discussed above, in some instances, an optical sensor may be configured to distinguish between different wavelengths of light using pixel filters. FIG. 7 is a conceptual illustration of an example arrangement of pixel filters. As shown in FIG. 7, an example optical sensor may include a plurality of pixel sensors 702. For instance, the plurality of pixel sensors 702 may be a pixel array that is arranged in a grid. Furthermore, an array of pixel filters 704 may overlay each of the plurality of pixel sensors 702.

In one embodiment, a particular arrangement of the array of pixel filters 704 may enable an optical sensor to distinguish between different wavelengths of light. By way of example, the array of pixel filters 704 may be arranged in an alternating pattern such that every other pixel sensor is filtered to record one of two different wavelengths of light. In such a pattern, a first pixel filter 706 may overlay a first pixel sensor 708 and record a first wavelength of light, while a second pixel filter 710 may overlay an adjacent pixel sensor 712 and record a second wavelength of light. In other words, the first pixel filter 706 may allow light having the first wavelength to reach the pixel sensor, but filter out light having the second wavelength. Similarly, the second pixel filter 710 may allow light having the second wavelength to reach the pixel sensor, but filter out light having the first wavelength. Thus, the optical sensor may output a pattern image in which data corresponding to each pixel is either a sensor value for light of the first wavelength or a sensor value for light of the second wavelength.

In some examples, a computing device may then interpolate the pattern image output by the optical sensor to determine a full image in which data corresponding to every pixel includes a first estimate for light of the first wavelength and a second estimate for light of the second wavelength.

In some examples, using block matching to determine corresponding features between two images may introduce uncertainty in the locations of edges of an object. As discussed above, block matching techniques may involve matching a segment of pixels from one image against a range of segments of pixels of another image. Furthermore, block matching may require matching a segment that contains enough information about a projected pattern to be unique. In some instances, a segment may be an array of pixels (e.g., an 11×11 array of pixels, a 21×21 array of pixels, etc.). As a result, at the occluding edges of objects, there may be an uncertainty of at least half of the size of the segment between near and far depths due to the use of the matching segments.

Figure 8:
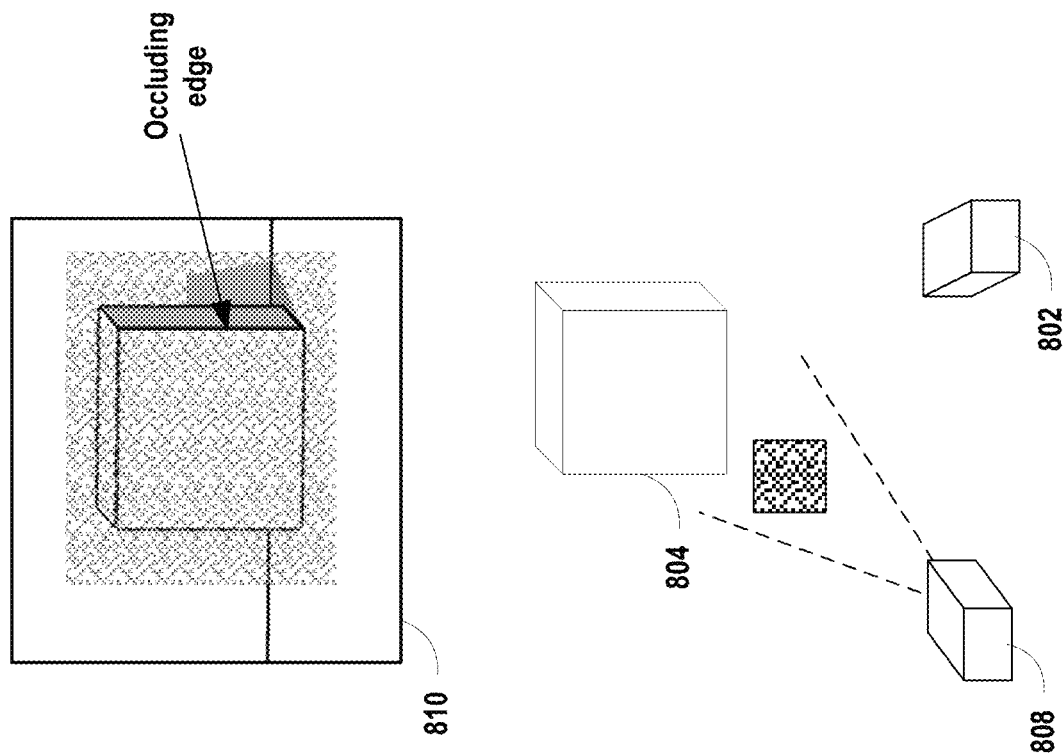
FIG. 8 is a conceptual illustration of an example image segmentation based on shadows in an image.
Figure 8:
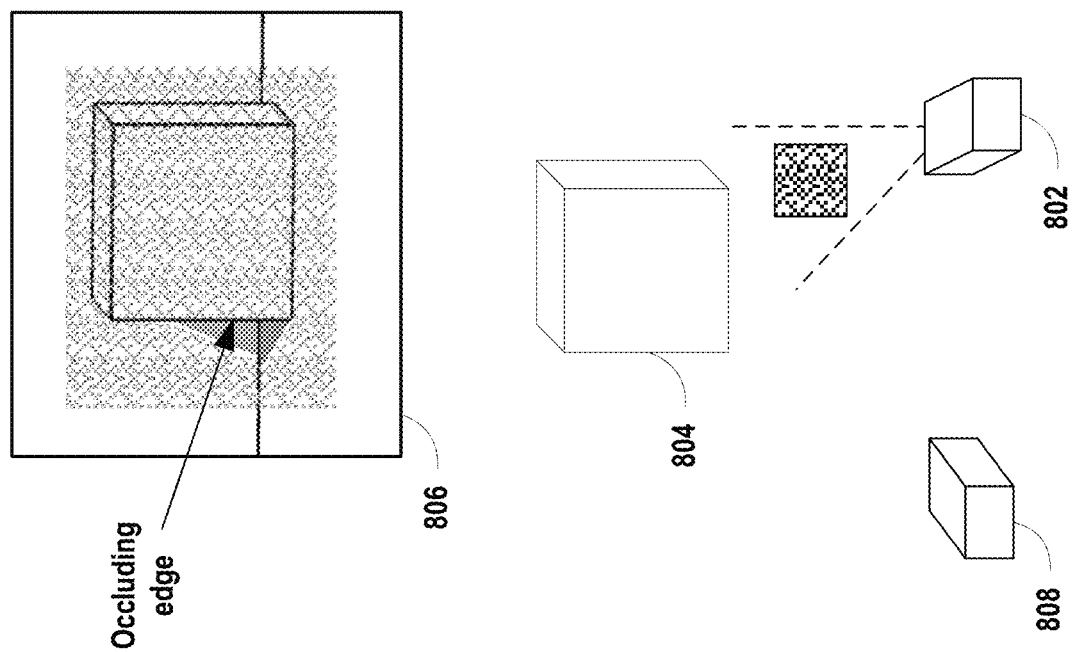

According to various embodiments, a sharper boundary on the object (i.e., a more precise estimate of the location of the occluding edge of the object) can be resolved by segmenting the object boundary by other means. FIG. 8 is a conceptual illustration of an example image segmentation based on shadows in an image. As shown in FIG. 8, in some examples, a first projector 802 may project a first pattern from a right side of an object 804 at a first instance in time. Due to the position of the first projector 802 relative to the object 804, the object 804 may cast a shadow on the left side in a first image 806 that is captured while the first pattern is projected onto the surface of the object 804. The shadow may take the form of a portion of an occluded background in the image that is not illuminated by the first pattern, for example.

Furthermore, a second projector 808 may project a second pattern from a left side of the object 804 at a second instance in time. Due to the position of the second projector 808 relative to the object 804, the object 804 may cast a shadow on the right side in a second image 810 that is captured while the second pattern is projected onto the surface of the object 804. Again, the shadow may take the form of a portion of an occluded background in the image that is not illuminated by the second pattern, for example.

Since the shadows provide additional information about the location of the occluding edges of the object, a computing device may utilize the location of the shadows in the first image 806 and the second image 810 to refine the location of the occluding edge(s) of the object 804. For example, the computing device may determine that a left edge of the surface of the object 804 is located at a position corresponding to the right-most portion of the shadow in the first image 806. And the computing device may determine that a right edge of the surface of the object 804 is located at a position corresponding to the left-most portion of the shadow in the second image 810. Therefore, the computing device may use the location of the shadows in the first image 806 and the second image 810 to estimate the location of one or more edges of the object.

In other examples, additional segmentation techniques may be used. For example, a system may collect depth information using the techniques described above. In addition, an RGB or grayscale camera may be used to segment color or gray scale boundaries using various color and/or texture segmentation techniques. By way of example, suppose that using block matching to determine depths to surfaces of an object reveals fuzzy boundaries. Using color segmentation of images may delineate the edges of the object more precisely when the surface of the object is a different color or texture than an occluded background. This information regarding the edges of the object determined by the color segmentation of images may then be combined with the depth information determined by block matching to refine the location of edges of the object. For instance, the computing device may determine where the depth measurements indicate the presence of an occluding boundary, and use the color segmentation information to adjust the location of the boundary.

As another example, particular patterns may be projected from each side of an object to help localize the position of occluding edges of an object. For instance, a system may include an optical sensor, a projector located to the left of the optical sensor, and a projector located to the right of the optical sensor. Each projector may project a different pattern at the same time. For instance, the texture projected by the projector on the left of the optical sensor may include lines that slant to the left (e.g., from a top-right corner to a bottom-left corner when observed in an image) when observed in an image, and the texture projected by the projector on the right of the optical sensor may include lines that slant to the right when observed in an image. In an image of the object, on the left of an occluded boundary on the left edge of an object there would only be left slanting patterns, while on the right of an occluded boundary on the right edge of an object there would only be right slanting patterns. In areas reachable by both projectors, an "X" pattern of projection would result. Accordingly, a computing device may use this information to segment an image and determine the location of edges of an object.

In some embodiments, information captured by a stereo camera(s) at different positions may be used to perform better 3D reconstruction. In a stereo camera, the distance between the optical sensors of the stereo camera, known as the baseline, affects the ability of the stereo camera to determine distances to objects. Advantageously, the baseline may be expanded by combining information from two stereo cameras located at different positions, or moving a single stereo camera to different positions.

For example, a first stereo camera located a first position may be used to determine a first depth image, and a second stereo camera located at a second position may be used to determine a second depth image. Or alternatively, a single stereo camera that is initially located at a first position may be used to determine a first depth image, and then the stereo camera may be moved to a second position in order to determine a second depth image. In either scenario, the first depth image and the second depth image may then be combined to perform better 3D reconstruction.

Figure 9:
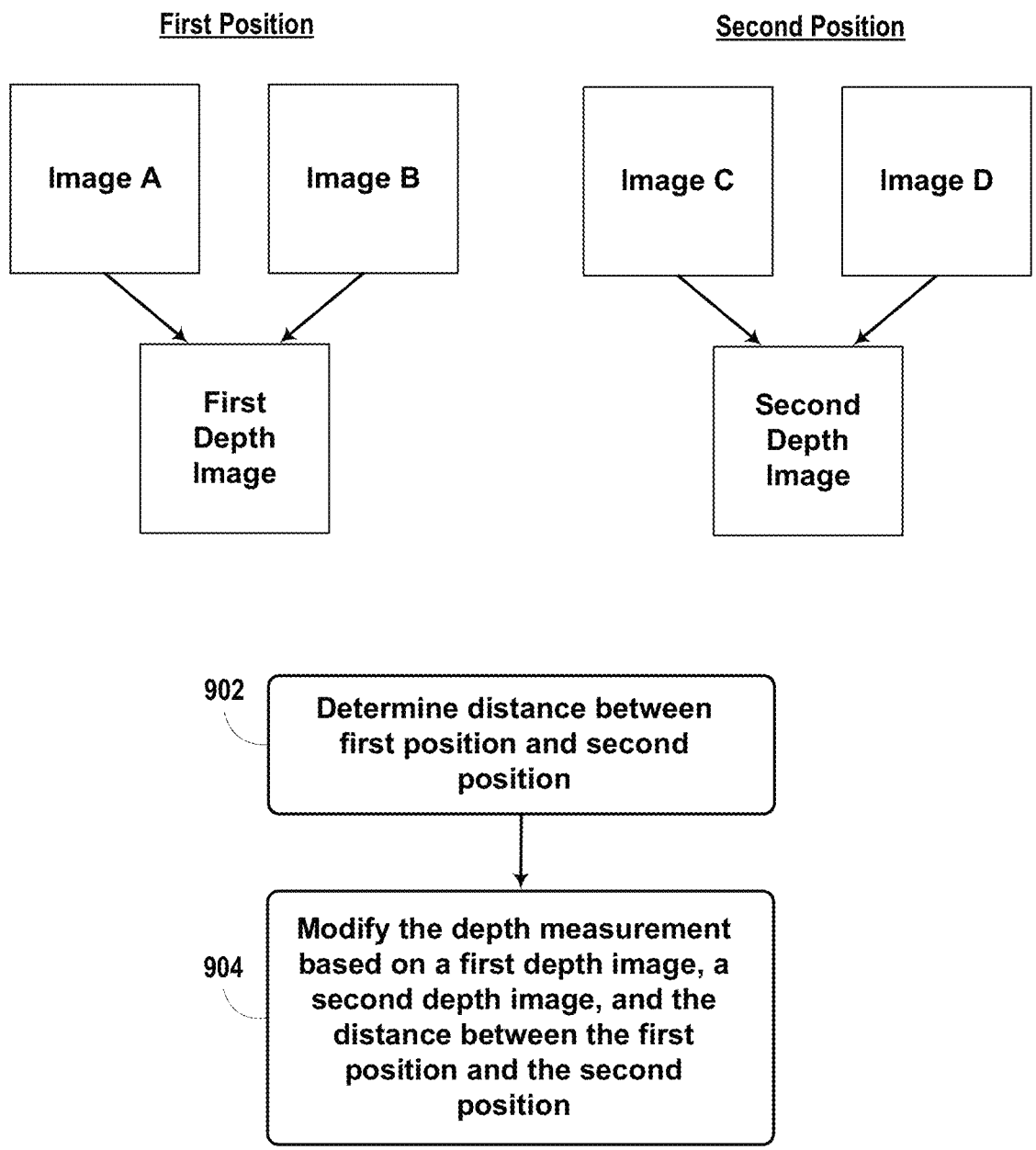
FIG. 9 is block diagram of additional or optional functions that may be performed in conjunction with the example method of FIG. 3.

FIG. 9 is a block diagram of additional or optional functions for combining a first depth image associated with a first position and a second depth image associated with a second position. In some examples, the additional or optional functions may be performed in conjunction with the example method 300 of FIG. 3. As shown in FIG. 9, the function at block 902 involves determining a distance between a first position and a second position. For instance, a computing device may determine a first position of a first stereo camera and a second position of a second stereo camera, and determine the distance between the two stereo cameras. Or the computing device may determine the first position of a stereo camera at a first time period and the second position of the stereo camera at a second time period, and determine the distance between the first position and the second position.

And the function at block 904 involves modifying the depth measurement based on a first depth image, a second depth image, and a distance between the first position and the second position. By way of example, the computing device may modify at least one previously determined depth measurement using the first depth image and/or the second depth image. For instance, the computing device may produce a 3D reconstruction that integrates information from the first depth image and the second depth image, thus providing higher resolution and less noise than either of the two depth images individually.

In one implementation, integration may be done using a volumetric system called truncated signed distance function (TSDF), which allows efficient integration of depth images for a wider FOV and lower noise. The TSDF volume may consist of a regular 3D grid, containing a signed scalar field indicating the distance to the nearest depth point. For each depth pixel in an input image, a projected ray may be averaged into the volume, with zero in the cell exactly at the depth 3D point, positive values closer to the camera, and negative values further away. Successive depth images that are registered to the volume may then be integrated. Therefore, a surface is implicitly represented by the volume, at those points in the volume where the scalar field switches sign. In some cases, either 3D points or explicit surface information may then be extracted for use as the input to other algorithms, such as obstacle avoidance. The 3D points or surface information may be extracted in several different ways. For example, the information may be extracted using the marching cubes algorithm, which constructs a surface from the TSDF, and as a side effect, also extracts the 3D points represented by the TSDF.

In another implementation, depth information from the first depth image and the second depth image may be used to help determine a finer depth value for a wide-baseline method. For instance, the first depth image may have an associated visual image, and the second depth image may also have an associated visual image. From the known relative pose of the device(s) used to capture the two images, and the depth values in the respective depth images, a small visual region in the first visual image corresponding to a small region in the second visual image may be identified. The depth values and relative pose may be sufficient to identify the correspondence, such that the two small regions overlap; but, the two small regions may not overlap perfectly. A further match may be done on the two visual regions to better align the two regions with one another. The better alignment may thus yield a better depth estimate for the region, because the baseline between the first position and the second position used to acquire the depth images is much larger than the baseline of any individual device (e.g., an individual stereo camera).

In a further refinement, it is noted that the two matched visual regions may not look quite the same, because the first visual image and the second visual image are taken from different viewpoints. Since the depth at each point in the visual region is known (e.g., from the depth image), and the relative pose of the two viewpoints is also known, the first matched visual region may be warped to determine a representation of the first matched visual region as if it were viewed from the second viewpoint. Determining the warped representation of the first matched visual region may allow a computing device to then determine a much better correspondence and alignment between the first matched visual region and the second matched visual region.

Figure 10:
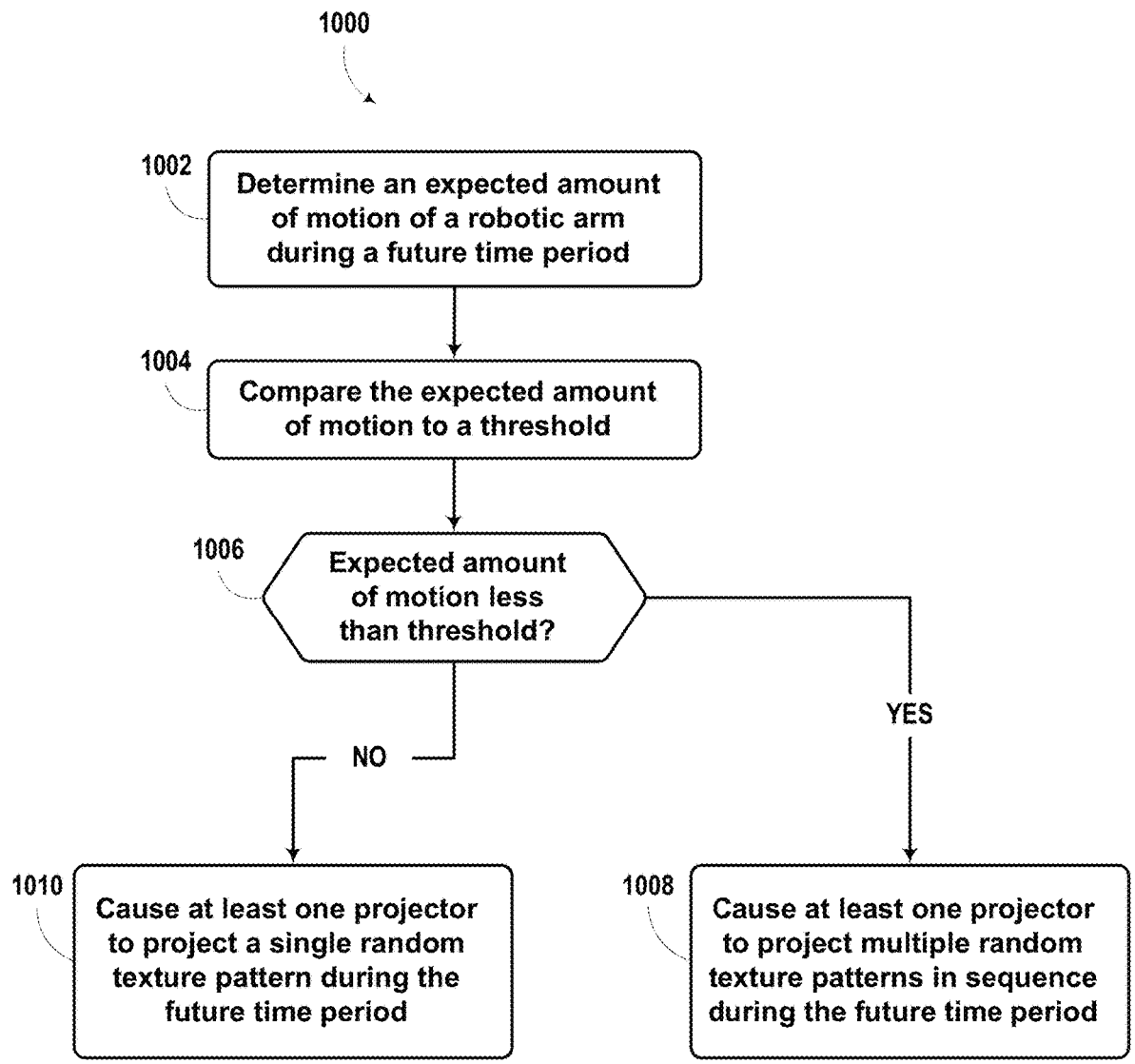
FIG. 10 is a flow chart of still another method, according to an example embodiment.

In line with the discussion above, in some examples, a computing device may be configured to change the number of patterns projected by the at least one projector based on an expected amount of motion in the environment. FIG. 10 is a flow chart of an example method 1000 for determining a number of patterns to project. Method 1000 shown in FIG. 10 presents an embodiment of a method that could be used or implemented by the control system 140 of FIG. 1, for example, or more generally by one or more components of any computing device. Method 1000 may include one or more operations, functions, or actions as illustrated by one or more of blocks 1002-1010. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 1000, each block may represent a module, a segment, or a portion of program code, which includes one or more instructions executable by a processor or computing device for implementing specific logical functions or steps in the process. In addition, each block in FIG. 10 may represent circuitry that is wired to perform the specific logical functions in the process.

Initially, at block 1002, the method 1000 involves determining an expected amount of motion of a robotic manipulator during a future time period. In one example, the expected amount of motion of the robotic manipulator may be a change in the position of the robotic manipulator during the future time period. For instance, if a movement plan for the robotic manipulator indicates that the robotic manipulator is expected to move from a first position to a second position that is one meter away during the future time period, the expected amount of motion may be one meter. In another example, the expected amount of motion may be a maximum expected velocity during a future time period, or a maximum expected acceleration during a future time period.

At block 1004, the method 1000 involves comparing the expected amount of motion to a threshold. In one example, the threshold may be a distance threshold, such as one centimeter, one meter, etc. In another example, the threshold may be a velocity threshold, or an acceleration threshold.

At block 1006, a computing device may determine whether the expected amount of motion is less than the threshold. If the computing device determines that the expected amount of motion is less than the threshold, then at block 1008, the computing device may cause at least one projector to project multiple random texture patterns in sequence during the future time period. For instance, the computing device may cause a first projector to project multiple random texture patterns in sequence and cause a second projector to project multiple random texture patterns in sequence during the future time period. Or the computing device may cause a first projector to project multiple random texture patterns in sequence and cause a second projector to project a single random texture pattern during the future time period.

On the other hand, if the computing device determines that the expected amount of motion is not less than the threshold, then at block 1010, the computing device may cause at least one projector to project a single random texture pattern during the future time period. Alternatively, at block 1010, the computing device may cause a first projector to project a first random texture pattern during the future time period and cause a second projector to project a second random texture pattern at the same time.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   determining, by a computing device comprising a processor, a first depth image using first sensor data captured by a first stereo camera located at a first position in an environment, wherein the first depth image comprises first depth values associated with respective pixels;

determining, by the computing device, a second depth image using second sensor data captured by a second stereo camera located at a second position in the environment, wherein the second depth image comprises second depth values associate with respective pixels;

determining a distance between the first position and the second position; and determining, based on the determined distance, an output including a virtual representation of the environment, wherein the virtual representation of the environment integrates the first depth values of the first depth image and the second depth values of the second depth image and includes a depth measurement indicative of a distance to at least one object in the environment.

2. The method of claim 1, wherein determining the output comprises registering the first depth image and the second depth image within a three-dimensional grid using a truncated signed distance function.

3. The method of claim 1, wherein determining the output comprises:
determining that a sub-region of the first depth image corresponds to a sub-region of the second depth image; and
combining depth data for the sub-region of the first depth image and depth data for the sub-region of the second depth image to determine the distance to at least one object in the environment.

4. The method of claim 3, wherein determining the output further comprises warping the sub-region of the first depth image to determine a representation of the sub-region of the first depth image as if the sub-region of the first depth image was viewed from the second position.

5. The method of claim 1, wherein the first stereo camera, the second stereo camera, or both are coupled to a robotic manipulator.

6. The method of claim 1, further comprising capturing the first sensor data using the first stereo camera.

7. The method of claim 6, further comprising projecting a pattern of light using a projector, wherein the first sensor data is indicative of the pattern of light.

8. The method of claim 6, further comprising projecting different patterns of light using at least one projector, wherein the first sensor data is indicative of the different patterns of light.

9. The method of claim 8, wherein projecting the different patterns of light using the at least one projector comprises projecting a first texture pattern having a first wavelength using a first projector while projecting a second texture pattern having a second wavelength using a second projector such that at least a portion of the first texture pattern overlaps at least a portion of the second texture pattern on a surface in the environment.

10. The method of claim 8, wherein projecting the different patterns of light using the at least one projector comprises projecting a first texture pattern and then subsequently projecting a second texture pattern.

11. The method of claim 6, further comprising capturing the second sensor data using the second stereo camera at a same time as the first stereo camera captures the first sensor data.

12. A method comprising:
determining, by a computing device comprising a processor, a first depth image using first sensor data captured by a stereo camera at a first time period, wherein the stereo camera is located at a first position in an environment at the first time period, and wherein the first depth image comprises first depth values associated with respective pixels;

determining, by the computing device, a second depth image using second sensor data captured by the stereo camera at a second time period, wherein the stereo camera is located at a second position in the environment at the second time period, and wherein the second depth image comprises second depth values associated with respective pixels;

determining a distance between the first position and the second position; and determining, based on the determined distance, an output including a virtual representation of the environment, wherein the virtual representation of the environment integrates the first depth values of the first depth image and the second depth values of the second depth image and includes a depth measurement indicative of a distance to at least one object in the environment.

13. The method of claim 12, further comprising causing the stereo camera to move from the first position to the second position.

14. The method of claim 13, wherein the stereo camera is coupled to a robotic manipulator, and wherein causing the stereo camera to move from the first position to the second position comprises causing the robotic manipulator to move the stereo camera from the first position to the second position.

15. The method of claim 12, wherein determining the output comprises registering the first depth image and the second depth image within a three-dimensional grid using a truncated signed distance function.

16. The method of claim 12, wherein determining the output comprises:
determining that a sub-region of the first depth image corresponds to a sub-region of the second depth image; and
combining depth data for the sub-region of the first depth image and depth data for the sub-region of the second depth image to determine the distance to at least one object in the environment.

17. The method of claim 16, wherein determining the output further comprises warping the sub-region of the first depth image to determine a representation of the sub-region of the first depth image as if the sub-region of the first depth image was viewed from the second position.

18. A system comprising:
a robotic manipulator;
a stereo camera coupled to the robotic manipulator; and
a computing device comprising a processor, wherein the computing device is configured to perform functions comprising:
determining a first depth image using first sensor data captured by the stereo camera at a first time period, wherein the stereo camera is located at a first position in an environment at the first time period, and wherein the first depth image comprises first depth values associated with respective pixels,
determining a second depth image using second sensor data captured by the stereo camera at a second time period, wherein the stereo camera is located at a second position in the environment at the second time period, and wherein the second depth image comprises second depth values associated with respective pixels, determining a distance between the first position and the second position, and determining, based on the determined distance, an output including a virtual representation of the environment, wherein the virtual representation of the environment integrates the first depth values of the first depth image and the second depth values of the second depth image and includes a depth measurement indicative of a distance to at least one object in the environment.

19. The system of claim 18, wherein the functions further comprise causing the robotic manipulator to move the stereo camera from the first position to the second position.

20. The system of claim 18, further comprising at least one projector coupled to the robotic manipulator.

21. The system of claim 18, wherein the robotic manipulator is mounted on a moveable apparatus.

* * * * *